(12) United States Patent
Hoshiai et al.

(10) Patent No.: US 7,702,744 B2
(45) Date of Patent: Apr. 20, 2010

(54) SEMANTIC INFORMATION NETWORK (SION)

(75) Inventors: Takashige Hoshiai, Tokyo (JP); Yukio Kikuya, Tokyo (JP); Hiroshi Shibata, Tokyo (JP); Takamichi Sakai, Tokyo (JP); Michiharu Takemoto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1105 days.

(21) Appl. No.: 10/220,864

(22) PCT Filed: Mar. 7, 2001

(86) PCT No.: PCT/JP01/01771

§ 371 (c)(1),
(2), (4) Date: Mar. 27, 2003

(87) PCT Pub. No.: WO01/67690

PCT Pub. Date: Sep. 13, 2001

(65) Prior Publication Data

US 2003/0167352 A1    Sep. 4, 2003

(30) Foreign Application Priority Data

| Mar. 7, 2000 | (JP) | 2000-062447 |
| Jul. 5, 2000 | (JP) | 2000-204203 |
| Sep. 19, 2000 | (JP) | 2000-284075 |
| Sep. 19, 2000 | (JP) | 2000-284076 |

(51) Int. Cl.
  *G06F 15/16* (2006.01)

(52) U.S. Cl. ........................ 709/217; 709/218; 709/219

(58) Field of Classification Search ............... 707/1–10; 709/217–219
See application file for complete search history.

(56) References Cited

U.S. PATENT DOCUMENTS

| 5,758,332 A * | 5/1998 | Hirotani ........................ 707/1 |
| 5,870,605 A | 2/1999 | Bracho et al. |
| 5,970,490 A * | 10/1999 | Morgenstern ................. 707/10 |
| 6,021,443 A * | 2/2000 | Bracho et al. ............... 709/241 |
| 6,134,532 A * | 10/2000 | Lazarus et al. ........... 705/14.25 |
| 6,178,416 B1 * | 1/2001 | Thompson et al. ............. 707/3 |
| 6,263,335 B1 * | 7/2001 | Paik et al. ....................... 707/5 |

(Continued)

FOREIGN PATENT DOCUMENTS

JP    1231542 A1    9/1989

(Continued)

OTHER PUBLICATIONS

The Gnutella Protocol Specification v0.4, Document revision 1.2, URL, http://gnutella.wego.com.

(Continued)

*Primary Examiner*—Benjamin R Bruckart
*Assistant Examiner*—Alicia Baturay
(74) *Attorney, Agent, or Firm*—Darby & Darby P.C.

(57) ABSTRACT

A semantic information-oriented network provides delivering network of an event comprising semantic information and data. For delivering event information, the semantic information-oriented network comprises an apparatus that provides an event place that is a place for comparing an event from an event sender with a filter being information related to an event receiver, and that is the smallest unit required to guarantee a common ontology system, and is an event delivery range.

43 Claims, 31 Drawing Sheets

U.S. PATENT DOCUMENTS

| | | | |
|---|---|---|---|
| 6,363,378 B1* | 3/2002 | Conklin et al. | 707/5 |
| 6,424,973 B1* | 7/2002 | Baclawski | 707/102 |
| 6,498,795 B1* | 12/2002 | Zhang et al. | 370/400 |
| 6,640,231 B1* | 10/2003 | Andersen et al. | 707/102 |
| 6,665,656 B1* | 12/2003 | Carter | 707/3 |
| 6,772,141 B1* | 8/2004 | Pratt et al. | 707/3 |
| 6,850,944 B1* | 2/2005 | MacCall et al. | 707/100 |
| 7,058,543 B2* | 6/2006 | Takahashi et al. | 702/183 |
| 2001/0003183 A1* | 6/2001 | Thompson et al. | 707/3 |
| 2002/0150093 A1* | 10/2002 | Ott et al. | 370/389 |
| 2004/0054690 A1* | 3/2004 | Hillerbrand et al. | 707/104.1 |
| 2004/0117333 A1* | 6/2004 | Voudouris et al. | 706/13 |

FOREIGN PATENT DOCUMENTS

| | | | |
|---|---|---|---|
| JP | 3042940 | A1 | 2/1991 |
| JP | 6014056 | A1 | 1/1994 |
| JP | 9-46689 | A1 | 2/1997 |
| JP | 09-106421 | | 4/1997 |
| JP | 11-53273 | A1 | 2/1999 |
| JP | 11-127427 | A1 | 5/1999 |
| JP | 2000-165449 | | 6/2000 |

OTHER PUBLICATIONS

Clarke, Ian, "A Distributed Decentralised Information Storage and Retrieval System", Division of Informatics University of Edinburgh, Jul. 1999.

http://www.gnutella.com/.

http://www.cs.colorado.edu/~carzanig/papers/phd_thesis.pdf "Architectures for an Event Notification Service Scalable to Wide-area Networks" Ph.D. Thesis Politechnico di Milano, Dec. 1998.

http://www.cs.colorado.edu/~carzanig/papers/cucs-888-99.pdf "Interfaces and Algorithms for a Wide-Area Event Notification Service" University of Colorado, Department of Computer Science, Technical Report CU-CS-888-99, Oct. 1999.

http://www.cs.colorado.edu/~carzanig/papers/cucs-902-00.pdf "Content-Based Addressing and Routing: A General Model and its Application" University of Colorado, Department of Computer Science, Technical Report CU-CD-902-00, Jan. 2000.

Technical Report of IEICE (The Institute of Electronics Information and Communication Engineers), SSE95-134, vol. 95, No. 398, pp. 55-60 (Dec. 1995). "Introducing Ontology to Telecommunication Services Development".

Presentation at General Conference of Communication Society of IEICE (The Institute of Electronics Information and Communication Engineers), Autumn 1999 B-7-7 (Sep. 1999) "Study on agent technology for detecting appropriate contents".

Technical Report of IEICE (The Institute of Electronics Information and Communication Engineers), J83-D-I, No. 2, pp. 306-312 (Feb. 2000). "Contents Delivery Component with Proposal of Personalized Information: Preference".

Technical Report of IEICE (The Institute of Electronics Information and Communication Engineers), SSE99-189, IN99-152 pp. 55-62 (Mar. 2000). "Autonomous Decentralized Comparison Environment Architecture and Contents Information Networks for Establishing an Order Taking Cyber Society".

Technical Report of IEICE (The Institute of Electronics Information and Communication Engineers), J83-D-I No. 9, pp. 1001-1012 (Sep. 2000). "Autonomous Decentralized Comparison Environment Architecture for an Order Taking-Oriented Information Proposal and its Performance Evaluation".

Technical Report of IEICE (The Institute of Electronics Information and Communication Engineers), J84-B No. 3, pp. 411-424 (Mar. 2001). "SION Architecture: Semantic Information-Oriented Network Architecture".

The Journal of The Institute of Electrical Engineers of Japan (Denki-gakkai Shi) vol. 121, No. 3, pp. 178-184 (Mar. 1, 2001) "Leading-Edge Applications (4) New paradigm on the Internet: Business Model Based on Non-Broker and its Technology".

Technical Report of IEICE (The Institute of Electronics Information and Communication (Engineers), SSE 2000-226-235, pp. 65-72 (Mar. 1, 2001). "New paradigm on the Internet: Non-Broker Model and its Implementation Technology 'SION (Semantic Information-Oriented Network)".

* cited by examiner

FIG. 6

Event

| Event type name | |
|---|---|
| "Service" | = = Housing inf. |
| "CPU power" | > = 150 |
| "Age" | > = 20 |
| ⋮ | |
| Object reference, file name | |

- Name of Event Type that Event belongs to.
- Condition name and value.

FIG. 7

Filter

| Event types name permitted into this filter. | |
|---|---|
| "Service" | Stock quotations |
| | Housing info. |
| "CPU power" | 200 |
| "Age" | 25 |
| ⋮ | |

- *.* is wild card. All event types are permitted into this filter.
- A pair of attribute name and attribute value.

(1) Register user's information
(2) Refer user's information
(3) Send data according to user's information

FIG. 24

```
Content Conditions of Advertisement Content (Housing Information)

(1) Service Conditions
    Condition Name: Service                          Condition Value: Housing Information (2) Environment Conditions
    Condition Name: CPU Processing Capability        Condition Value: 150MHz or more
    Condition Name: Communication Band               Condition Value: 64Kbps or more (3) User Conditions
    Condition Name: Sex                              Condition Value: Male or Female
    Condition Name: Age                              Condition Value: 20 years old or older
    Condition Name: Address                          Condition Value: Metropolitan Residents Only
```

FIG. 25

User Preference Characteristics (1) Service Attribute
    Attribute Name: Service                    Attribute Value: Stock Movement. Housing Information (2) Environment Attributes
    Attribute Name: CPU Processing Capability  Attribute Value: 200MHz
    Attribute Name: Communication Band         Attribute Value: 128Kbps (3) User Attributes
    Attribute Name: Sex      Attribute Value: Male
    Attribute Name: Age      Attribute Value: 25 years old
    Attribute Name: Address  Attribute Value: Tokyo Metropolitan

SEMANTIC INFORMATION NETWORK (SION)

TECHNICAL FIELD

The present invention relates to a semantic information-oriented network, a semantic information switch, a semantic information router, a semantic information gateway, an event place, an event routing method, a federation method, a session, a filter management method, a statistical data collection method, an ontology conversion method, an ontology conversion information management method, and additional functions, that can directly specify the most appropriate information to an end user from among an enormous amount of information distributed around a network, and alternatively, in which an information provider can specify the most appropriate user to deliver information to.

BACKGROUND ART

A conventional network is expressed conceptually by the network model shown in FIG. 16. In FIG. 16, each terminal registers a terminal address (for example, a network address or a host address) as its identifier. Moreover, a send terminal sends an event (packet) comprising destination address (destination terminal address) and data onto the network. That is, the basic concept of a conventional information network is to deliver an event to its destination accurately based on a destination address.

A case is considered wherein recommendation services (personalized information recommendation services for recommending personalized information to each user, and yellow pages services such as search services and the like) are achieved with this network. Conventionally, intervention with a centralized server system (broker) is always necessary as shown in FIG. 18 in order to realize a personalized information recommendation service. Similarly, in a yellow pages service, it is also necessary to assume a broker called a search service. Such a centralized business model involving a broker is called the broker model. In this broker model, a broker takes the role of connecting an information provider and a user. That is, it is only possible for a user and an information provider to meet through a broker.

A detailed description of the broker model described above will be given using FIG. 19. As shown in FIG. 19, in a business model comprising three business roles, namely an end user (consumer 101 in the figure), an information provider (content provider 102), and additionally a service provider (content information provider) 103, the service provider 103 achieves a recommendation service for recommending content appropriate to an end user (consumer 101) by managing registered content information from an information provider (content provider 102) and registered end user preference information from an end user (consumer 101), and also comparing the registered content information and the end user preference information. Such a service provider corresponds to a broker.

Specific services include search services such as Yahoo and the like, trading services, and personalized information recommendation services for recommending content matching the interests of an end user without direct intervention by the end user.

Each such service is achieved as an integrated type service system (service application) in an individual service provider 103 on a network 109 or a content distribution network 110 as shown in FIG. 20.

This causes the following problems in the broker model.

(1) Since there is no mechanism for the information provider (content provider 102) to announce content information to the end user (consumer 101) without the intervention of a third party, it is not possible to achieve an information provider (content provider) initiative type, order-taking society, wherein the information provider (content provider 102) itself distributes content information. That is, the information provider (content provider 102), being a content provider, cannot distribute content information under its own policy without the intervention of a third party.

(2) In order to obtain a recommendation service from the service provider 103, the end user (consumer 101) must explicitly recognize the existence, the location, and the access method of the service provider 103.

(3) It is not possible to share content, content information and end user preference information among different service providers 103 easily. Heretofore, information has been shared by exchanging information according to protocols agreed in advance among service providers 103.

(4) Because of centralized management of content information and end user preference information by the service provider 103, it is not easy to build a system with high scalability. Heretofore, a classic method such as preparing a plurality of server systems for managing content information and end user preference information, or the like, has been used.

Incidentally, distributed processing technology such as the WWW (World Wide Web), CORBA and the like, provides an environment where content distributed onto heterogeneous distributed systems can be easily obtained, and also makes it possible for anybody to become a content provider easily. On the other hand, it is not easy to find content required by an end user among the vast amount of content flooding the world, and so the early establishment of techniques to realize such is desirable.

Taking such situations and the above-described problems into consideration, a brokerless model is proposed in which an information provider (content provider) can provide appropriate content directly to an appropriate end user without assuming the existence of a broker.

For methods of realizing a brokerless model, there are Gnutella, an invention by Sun (U.S. Pat. No. 5,870,605: Reference 1), and an invention by NEC (Japanese Patent Application No. 11-328654: Reference 2).

Gnutella is a network for searching and discovering a specific entity from among an unspecified number of entities (information) distributed around the Internet based on a P2P (Peer-to-Peer) interaction model. Here, in Gnutella, an entity is also called a servent. That is, each information provider performs massively distributed management of metadata (meta files), and establishes arbitrary connections between meta files (between hosts in which meta files are stored), and thus an massively distributed database of metadata is built by only the information provider. Then, collaboration of information providers with each other enables the construction of a distributed search network of metadata that does not require a broker. However, search request packets from consumers are broadcast to all information providers based on the connection. That is, since P2P type interactions are repeated to all hosts based on the connection information, unnecessary traffic increases in proportion to an increase in the number of hosts and metadata categories, so there is a problem of an extreme drop in scalability. Furthermore, there is a problem not only in scalability but also in aspects of interoperability, information sharing, extendibility, security, privacy, and the like.

Reference 1 describes a method that enables the request and use of information in a situation where an information provider (Publisher) and a user (Subscriber) have no knowledge of each other, without a broker. However, since it does not have a routing mechanism that suppresses unnecessary event forwarding, there is a problem of scalability. Furthermore, since it does not have an ontology (mechanism for converting event dictionaries) between territories, there are also problems in aspects such as interoperability, information sharing, extendibility, and the like. That is, reference 1 defines a territory where a common event dictionary (event dictionary) is shared. However, the method of realizing a territory and the method of sharing information among different territories are not made clear. Therefore regarding territory, the description of specific implementations is poor.

Reference 2 proposes information routing capable of routing not only packets having specific destination addresses but also packets containing only an assignment of region of interest. Searching that does not require a broker can be achieved by information routing. However, it does not have the concepts of an event place, which guarantees a unique ontology system and limits the event delivery range, gateway and session. As a result, there are problems in aspects of scalability, security, privacy, interoperability, information sharing, extendibility, and the like.

Accordingly, realization techniques of conventional brokerless models have the following four main problems.

Lack of Protection of Security and Privacy

There is no mechanism for limiting the information delivery range. That is, the spread of an event cannot be limited. As a result, it is possible for anybody who is connected to a network to see information.

Furthermore, the endpoint of information is a terminal of an end user, and this is accessible from the outside. Therefore, even if information that is not wanted to be opened outside is placed on the terminal, there is a possibility of releasing the information if it is connected to a network.

Since there is no session concept, although a network can be constructed by only event send and receive terminals, it is not possible to separate a network provider and an event sender-receiver.

Lack of Interoperability

In the case where regions with different semantic information systems (ontology systems) are created, since it does not have a mechanism for connecting those regions, it is not possible to share events among them.

It is not possible to forward only those events that are necessary.

Lack of Extendibility

It is difficult to dynamically add and delete functions.

It is not easy to expand network scale.

Lack of Scalability

Increases in number of event sender-receivers cannot be handled.

Increases in semantic information categories (metadata categories) cannot be handled.

Forwarding of unnecessary events cannot be suppressed.

DISCLOSURE OF THE INVENTION

The present invention takes such situations into consideration, with an object of providing a semantic information-oriented network, a semantic information switch, a semantic information router, a semantic information gateway, an event routing method, a federation method, a session, a filter management method, a statistical data collection method, an ontology conversion method, an ontology conversion information management method, and additional functions, wherein an end user can directly specify the most appropriate information from among an enormous amount of information distributed around a network, or an information provider can specify the most appropriate user to deliver information to, and furthermore an entity to communicate can be directly searched, discovered, and specified, without the intervention of a broker.

In order to achieve the above-described object, the present invention provides an event delivery apparatus for delivering, on a network, an event comprising data and semantic information, being metadata of the data, based on the semantic information, wherein there is provided an apparatus that provides an event place that is a place for comparing an event from an event sender with a filter in which semantic information of an event that an event receiver wishes to receive is set as an event acquisition condition, and that is the smallest unit required to guarantee a common ontology system, and is also an event delivery range.

Here, an apparatus for providing an event place is, for example, one or a plurality of computers. "Computer" here is an apparatus provided with a central processing unit (CPU) and memory connected such that it can be controlled by this CPU, being an apparatus that provides an event place by storing a program for achieving an event place in this memory and executing this program in the CPU. Accordingly, in the present invention, an apparatus (computer) for providing an event place may be a personal computer, a PDA, a mobile telephone, a workstation, a mainframe, or the like.

Since an event delivery apparatus of the present invention guarantees a common ontology system in event places, the accuracy of comparison of an event in an event place is guaranteed.

Furthermore, in the event delivery apparatus of the present invention, an event place is constructed for each subnet (physical network unit) for each service category, for each service operator, or according to stakeholders such as security, management units and the like, and thus it is possible to avoid increases in event types (semantic information categories) that regulate an ontology system.

Moreover, since an event place in an event delivery apparatus of the present invention is an event delivery range, it is easily possible to achieve localization of information (events) being delivered.

In the case where the number of event sender-receivers belonging to an event place is increased, it is possible to distribute the load easily by dividing the event places.

Furthermore, in an event delivery apparatus, it is possible to avoid unnecessary connections from an event sender-receiver and other event places to the event place, and as a result, it is possible to easily achieve high security and protection of private information of event sender-receivers.

Moreover, the present invention provides a community providing apparatus achieved in an environment wherein in the event delivery apparatus, the event place is provided with:

a semantic information switch that compares semantic information registered as the filter and semantic information assigned to the event, and informs the filter's event receiver of the event ignited based on the comparison result, and a semantic information router that routes an event between the semantic information switches based on event type, being a template of the semantic information, and also performs event forwarding between the semantic information switches, and the event delivery apparatus is further provided with a semantic information gateway for forwarding events between the event places, and the sending of events, reception of events, and the registration of the event types are performed through sessions, being connections between terminals of event receivers, event senders or event type registers, and semantic information switches, wherein there is provided:

a permission function for granting approval or denial or the like of participation in the community;

a management function for understanding and controlling information delivered in the community; and a statistical processing function for performing statistical management of information delivered in the community.

Furthermore, in the above-described community providing apparatus, the community is achieved using event places provided by the event delivery apparatus, and the management functions set values of information delivered from adjacent communities on the semantic information gateway provided by the event delivery apparatus.

In this manner, in a community providing apparatus of the present invention, it is also possible to delivered only information that is statistically delivered frequently (popular information) between adjacent communities as deliverable information from adjacent communities, for example from an adjacent community to its own community. Furthermore, in the community providing apparatus of the present invention, in a large scale system, it is also possible to obtain popular information without depending on a centralized server in one location.

Moreover, the present invention provides a semantic information gateway that is used when delivering events comprising data and semantic information, being metadata of the data, on a network, based on semantic information, which is provided with a forwarding section for forwarding an event between event places that are; places for comparing an event from an event sender with a filter in which semantic information of an event that an event receiver desires to receive is set as an acquisition condition of the event, the smallest units to guarantee a common ontology system, and also an event delivery range.

Using a semantic information gateway of the present invention, it is possible to share events among different event places. Furthermore, it is possible to achieve a global, autonomous decentralized comparison network using a bottom up approach.

Moreover, the present invention provides a semantic information switch for notifying an event receiver, being the destination of an event delivered on a network, of an event comprising data and semantic information, being metadata of the data, based on semantic information, which is provided with:

a function for registering a filter in which the semantic information of an event that an event receiver wishes to receive is set as an acquisition condition of the event;

a function for categorizing the filters for each event type, being templates of semantic information, and further subcategorizing the filters in each session for management, and in the case where a plurality of filters is registered in the same session, for managing the relationships between the filters as a logical OR operation;

a function for comparing the semantic information registered as the filter and semantic information assigned to the event; and a function for notifying the filter's event receiver of the event, based on the comparison result.

A semantic information switch of the present invention categorizes filters for each event type, being templates of the events, and manages them. In the case where a plurality of filters is registered in the same session, the relationships between the filters are managed as a logical OR operation, so that it is possible to compare the filters and events efficiently. Furthermore, in the present invention, a plurality of semantic information switches is prepared in one event place, and the semantic information switches are connected by semantic information routers, and thus it is possible to distribute filter processing to a plurality of semantic information switches.

Moreover, the present invention provides a semantic information router that determines an event delivery route comprising data and semantic information, being metadata of the data, on a network, which has:

a path selection function for selecting an event route between semantic information switches for notifying the event receiver of the event, based on event type, being a template of semantic information; and an event sending function for sending the event to the selected route.

Since a semantic information router of the present invention selects event routes between semantic information switches, it is possible to achieve a reduction of unnecessary comparisons and traffic in the semantic information switches.

Furthermore, the present invention provides methods provided by functions of each of the above-described event forwarding apparatus, community providing apparatus, semantic information gateway, semantic information switches, and semantic information router, also programs to execute some of the methods by computer, and a computer-readable recording medium on which the programs are recorded.

Moreover, by registering a filter in a semantic information switch of the present invention, it is possible to add functions. Functions that can be added include a statistical information collection function, and the like, being additional functions other than a standard semantic information gateway and a semantic information router. Here, by deleting a filter from a semantic information switch, it is possible to delete the function, and the functions that can be deleted include additional functions other than a standard semantic information gateway and semantic information router.

Using the present invention described above, an event receiver that connects to a semantic information-oriented network of the present invention, and receives an event, can receive the event it requires by registering a filter on a semantic information switch.

Furthermore, an event sender that sends the event can also send the event by describing semantic information, being metadata of the event, that indicates an event receiver targeted to receive it.

These enable 1) the event sender to directly send event content, that contains appropriate information, without knowing the existence of a receiver and without using a broker function, and 2) the event receiver to directly receive an event without knowing the existence of the event sender and without using a broker function. Moreover, it is possible 3) to perform transmission and reception in real time, since the direct transmission and reception described above does not require a broker, and 4) for a sender-receiver to connect to and disconnect from a semantic information-oriented network frequently.

Furthermore, the present invention provides a semantic information-oriented network for delivering an event comprising semantic information and data, wherein the semantic information-oriented network is provided with:

a delivery destination decision device for deciding the delivery destination of the event based on the content of the semantic information; and an event delivery device for delivering the event to the delivery destination decided by the delivery destination decision device.

Moreover, the present invention provides a semantic information switch that is connected to a plurality of entities to receive events delivered on the network, and activates an entity to receive an event based on semantic information contained in the event, incorporating:

a semantic information comparison device for comparing semantic information registered in advance and semantic information contained in an event; and a switching device for activating the entity based on the result of the comparison in the semantic information comparison device.

Furthermore, the present invention provides a semantic information router that routes an event on the network, and the semantic information router incorporates:

a route selection device for automatically selecting a route through which an event is delivered based on the content of semantic information contained in the event; and an event sending device for sending the event along the route selected by the route selection device.

Moreover, the present invention provides a semantic information gateway that interconnects between the smallest number of semantic information-oriented networks having different semantic information systems, and forwards an event containing semantic information, and the semantic information gateway incorporates:

an ontology conversion device for converting the ontology of the event based on the ontology system used by the semantic information-oriented network of the forwarding address of the event; and an event forwarding device for forwarding the event to a different semantic information-oriented network when its ontology has been converted.

Furthermore, the present invention provides a semantic information-oriented network incorporating the above-mentioned semantic information switch, the above-mentioned semantic information router and the above-mentioned semantic information gateway.

Moreover, the present invention provides an event routing method for determining an event route based on semantic information contained in the event, in the case of an event route comprising semantic information and data, and the event routing method has:

a shared link object creation process for creating a shared link object that establishes a shared link for event forwarding based on physical link information of an event place object;

an event path establishment process for establishing an event path to forward the event to, by registering a filter for a series of event place objects based on shared link information established by the shared link object; and an event delivery process for determining an event route based on the event path, and for delivering the event.

Furthermore, the present invention provides an event routing method for determining an event route on a network based on semantic information contained in the event, in the case of delivering an event comprising semantic information and data, and the event routing method has:

a shared link object creation process for creating a shared link object that establishes a ring shaped, unidirectional shared link for event delivery among event place objects on which semantic information is registered;

an event path establishment process for establishing an event path for each event type, by registering a filter for delivering the event to a series of event place objects based on a shared link established by the shared link object; and an event delivery process for determining a route for the event based on the event path, and for delivering the event.

Furthermore, the present invention provides an event routing method for determining an event route on a network based on semantic information contained in the event, in the case of delivering an event comprising semantic information and data, and the event routing method has:

a shared link object creation process for creating a shared link object that establishes a ring shaped, unidirectional shared link for event delivery among event place objects on which semantic information is registered;

a filter registration process for registering a filter containing a wildcard, assigned as an event type, in order to deliver the event for all event place objects based on a shared link established by the shared link object; and an event delivery process for comparing semantic information contained in the delivered event and the characteristics of the filter, determining a route of the event based on the comparison result, and delivering the event.

Moreover, the present invention provides an event routing apparatus for determining an event route based on semantic information contained in the event, in the case of delivering an event comprising semantic information and data, and the event routing apparatus has:

a shared link object creation process for creating a shared link object that establishes a ring shaped, unidirectional shared link for event delivery among event place objects on which semantic information is registered;

an event path establishment device for establishing an event path to deliver the event to, for each event type, by registering a filter for a series of event place objects based on shared link information established by the shared link object; and an event delivery device for determining a route for the event based on the event path, and for delivering the event.

Furthermore, the present invention provides an event routing apparatus for determining an event route on a network based on semantic information contained in the event, in the case of delivering an event comprising semantic information and data, and the event routing apparatus has:

a shared link object creation device for creating a shared link object that establishes a ring shaped, unidirectional shared link for event delivery among event place objects on which semantic information is registered;

an event path establishment device for establishing an event path to delivery the event to, for each event type, by registering a filter for a series of event place objects based on a shared link established by the shared link object; and an event delivery device for determining a route for the event based on the event path, and for delivering the event.

Furthermore, the present invention provides an event routing apparatus for determining an event route on a network based on semantic information contained in the event, in the case of delivering an event comprising semantic information and data, and the event routing apparatus has:

a shared link object creation device for creating a shared link object that establishes a ring shaped, unidirectional shared link for event routing among event place objects on which semantic information is registered;

a filter registration device for registering a filter containing a wildcard, assigned as an event type, in order to deliver the event to all event place objects based on a shared link established by the shared link object; and an event delivery device for comparing semantic information contained in the delivered event and the characteristics of the filter, determining a route of the event based on the comparison result, and delivering the event.

Moreover, the present invention provides a highly reliable event delivery method wherein an event sender delivers an event to an unspecified number of event receivers via an event notification service under a network environment, and a plurality of paths for delivery are prepared, wherein the event notification service assigns each event an identifier that can identify it uniquely under the network environment, and can detect that the same event was delivered from a different path by comparison with the identifiers of events delivered and stored in the past.

Furthermore, in a highly reliable event delivery method, event whose identifier has been removed is delivered to at least one event notification service directly connected to the event sender among the unspecified number of event receivers, and an event that is assigned identifier is delivered to at least one event notification service located downstream of the directly connected notification service.

Moreover, the present invention provides a highly reliable event delivery method wherein an event sender delivers an event to an unspecified number of event receivers via an event notification service in a network environment, and a plurality of routes are prepared for delivering the event, characterized in that there is provided:

a first step of sending an event to an unspecified number of event receivers from the event sender via a directly connected event notification service;

a second step of assigning each event an event identifier that can identify it uniquely in a network environment, and also for storing the event identifier in an event identifier list in the event notification service;

a third step in which the event notification service directly connected to the event sender delivers an event from which the identifier is removed to an event receiver directly connected to the event notification service among the unspecified number of event receivers, and delivers an event that is assigned the identifier to an event notification service located downstream of the directly connected event notification service;

a fourth step of checking whether the same event identifier is stored or not by referring to the event identifier list inside the event notification service that received the event, and deleting the event in the case where there is the same event identifier, and storing the event identifier in the event identifier list in the case where there is none; and a fifth step in which the event notification service, on receiving a forwarded event from the event notification service, delivers an event from which the identifier has been removed to an event receiver directly connected to the event notification service among the unspecified number of event receivers, and delivers an event that is assigned the identifier to an event notification service located downstream of the directly connected event notification service.

Furthermore, the present invention provides a highly reliable event delivery method wherein an event sender delivers an event to an unspecified number of event receivers via an event notification service in a network environment, the event notification services are located at a plurality of network nodes and connected to each other, and a plurality of paths are prepared for delivering the event, which is provided with:

an event identifier assignment device for assigning each event an identifier that can be identified uniquely in a network environment in the event notification service;

an event identifier comparison device for comparing with the identifiers of events delivered and stored in the past to check whether a duplicate event was delivered from a different path; and an event identifier updating device for canceling the event in the case where the same event identifier exists, and for storing a new event identifier in the case where the same identifier does not exist.

Moreover, the present invention provides a content information delivery network in which, when a content provider, which provides content, recommends content that it holds to a consumer, who consumes the content, it directly recommends the offered content to a consumer appropriate to the content to be provided, which is provided with:

a content information delivery device for delivering content information which describes the conditions of a consumer appropriate to the content to be provided; and a content recommendation device for recommending offered content based on the content information.

Furthermore, in the above-described content information delivery network, the content information is information that the content provider sends, and the construction is such that there is provided a comparison device for matching the content information with user preference information, being acquisition conditions of content information that a consumer wishes to obtain, and the content recommendation device recommends offered content by autonomously notifying only content information that matches the user preference information from among the content information.

Moreover, in the content information delivery network, the content information and the user preference information are registered, and there is provided an event place for providing a place for the comparison device to compare this registered information, and a federation device for enabling information sharing among the event places.

Furthermore, in the content information delivery network, the content information and the user preference information are registered, and there is provided an event place for providing a place for the comparison device to compare this registered information, and a load delivery device for delivering event place objects in the event place to a plurality of computer systems, and sharing information among delivered event place objects.

Moreover, the above-described content information delivery network is provided with a user agent device for registering the user preference information as a filter in the event place, and the construction is such that the comparison device compares an event sent from the content provider with a filter registered by the user agent device, a filter that matches the event is activated as a result of the comparison, and a user agent device corresponding to this filter is activated autonomously.

Furthermore, the above-described content information delivery network is provided with a content-agent apparatus for registering the content information as a filter in the event place, and the construction is such that the comparison apparatus compares the user preference information sent from the consumer side as an event with the filter registered by the content-agent apparatus, and the consumer side extracts a filter that matches the event as a result of the comparison autonomously.

Moreover, the above-described content information delivery network is provided with: an event place creation apparatus for creating the event place based on an event place creation request;

a send session establishment apparatus for establishing a session to send an event to the event place;

a receive session establishment apparatus for establishing a session to receive an event from the event place;

a filter creation apparatus for creating the filter; and a filter registration apparatus for registering a filter in the event place with a filter identifier created by the filter creation apparatus as a parameter.

Moreover, the present invention provides a processing method of a content information delivery network in which, when a content provider, which provides content, recommends content that it holds to a consumer, who consumes the content, it directly recommends the offered content to a consumer appropriate to the content to be provided, which is provided with:

a content information delivery process for delivering content information which describes the conditions of an appropriate consumer for the content to be provided; and a content recommendation process for recommending offered content based on the content information.

Furthermore, in the above-described content information delivery network processing method, the content information is information that the content provider sends, and the content recommendation process recommends offered content by comparing the content information and user preference information, being an acquisition condition of content information that a consumer wants to obtain, and by autonomously notifying only content information that matches the user preference information from among the content information.

Moreover, in the above-described content information delivery network processing method, the content information and the user preference information are registered, and federation processing that enables information sharing among the event places is performed for an event place that provides a place to compare this registered information.

Furthermore, in the above-described content information delivery network processing method, the content information and the user preference information are registered, and load distribution processing is performed in which event place objects in an event place, which provides a place for the comparison apparatus to compare this registered information, are distributed on a plurality of computer systems, and information is shared among the distributed event place objects.

Moreover, in the above-described content information delivery network processing method, for a filter registered by the user agent apparatus, which registers the user preference information as a filter in the event place, an event sent from the content provider side is compared, and as a result of the comparison a filter that matches the event is activated, and the user agent apparatus corresponding to this filter is activated autonomously.

Furthermore, in the above-described content information delivery network processing method, for a filter registered by the content-agent apparatus, which registers the content information as a filter in the event place, the user preference information sent from the consumer side as an event is compared by the comparison process, and as a result of the comparison a filter that matches the event is extracted by the consumer side autonomously.

Moreover, the above-described content information delivery network processing method performs; event place creation processing for creating the event place based on an event place creation request, send session establishment processing for establishing a session to send an event in the event place, receive session establishment processing for establishing a session to receive an event in the event place, filter creation processing for creating the filter, and filter registration processing for registering a filter in the event place with an identifier of the filter created by the filter creation processing as a parameter.

Furthermore, the present invention provides a computer-readable recording medium on which a program for a computer to perform any of the above-described processing methods of the content information delivery network is recorded.

BRIEF DISCLOSURE OF DRAWINGS

FIG. 6 is an explanatory diagram showing an example of a definition of an event.

FIG. 7 is an explanatory diagram showing an example of a definition of a filter.

FIG. 24 is a diagram showing an example of a definition of content condition.

FIG. 25 is a diagram showing an example of user preference characteristics.

Figure 29A:
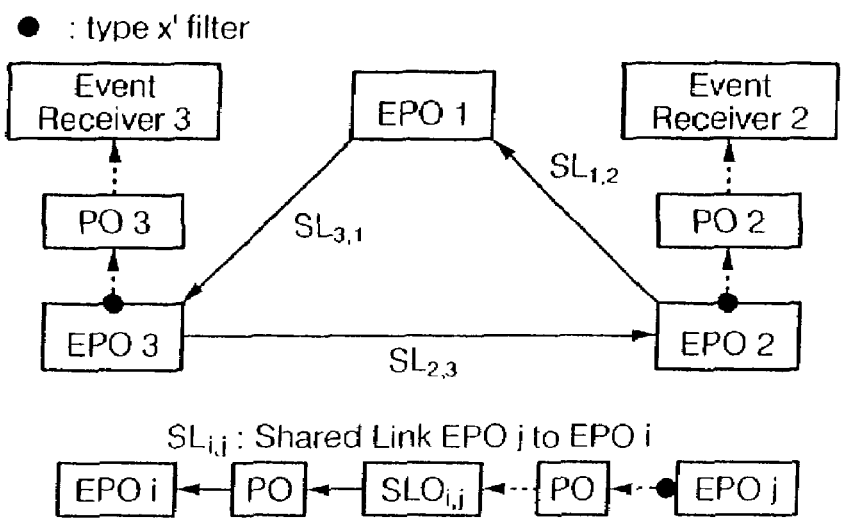

FIGS. 29A and B are explanatory diagrams showing an event routing method and registration conditions of a filter.

Figure 30:
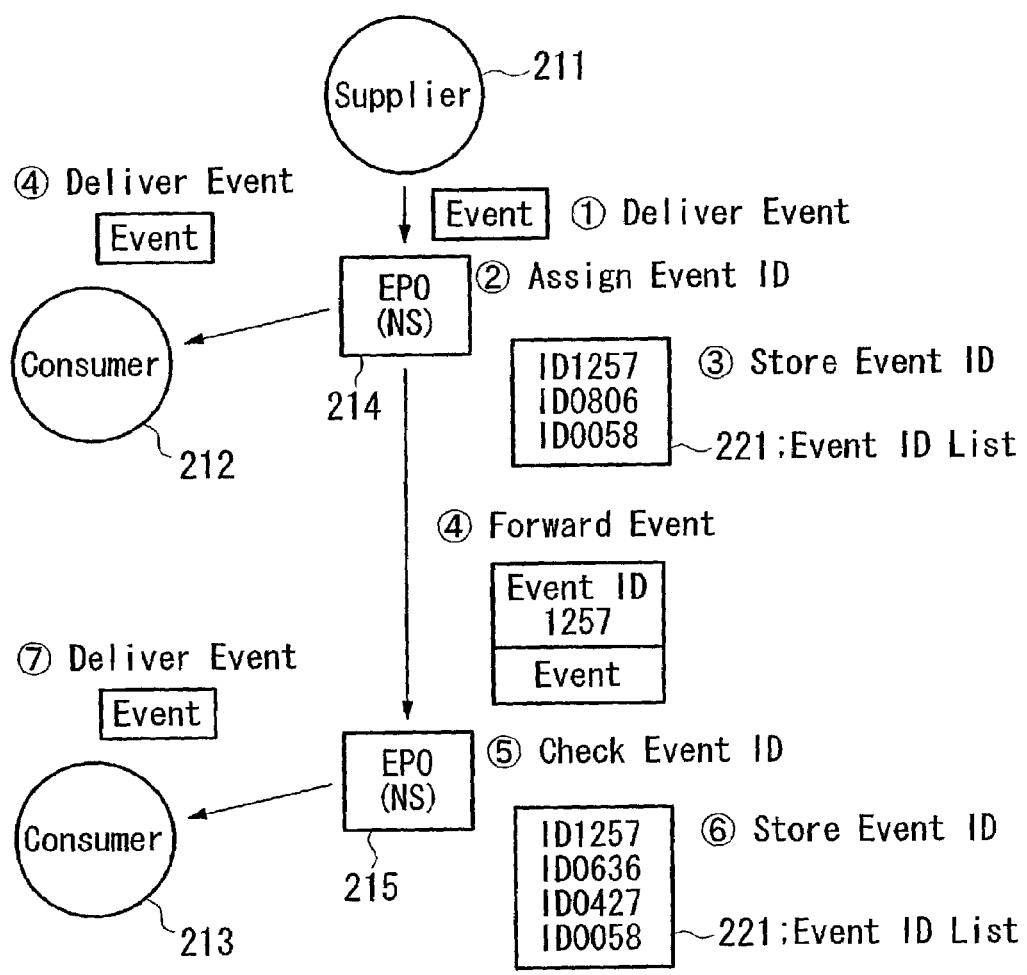

FIG. 30 is a conceptual diagram showing a procedure of event routing on a network tree.

Figure 31:
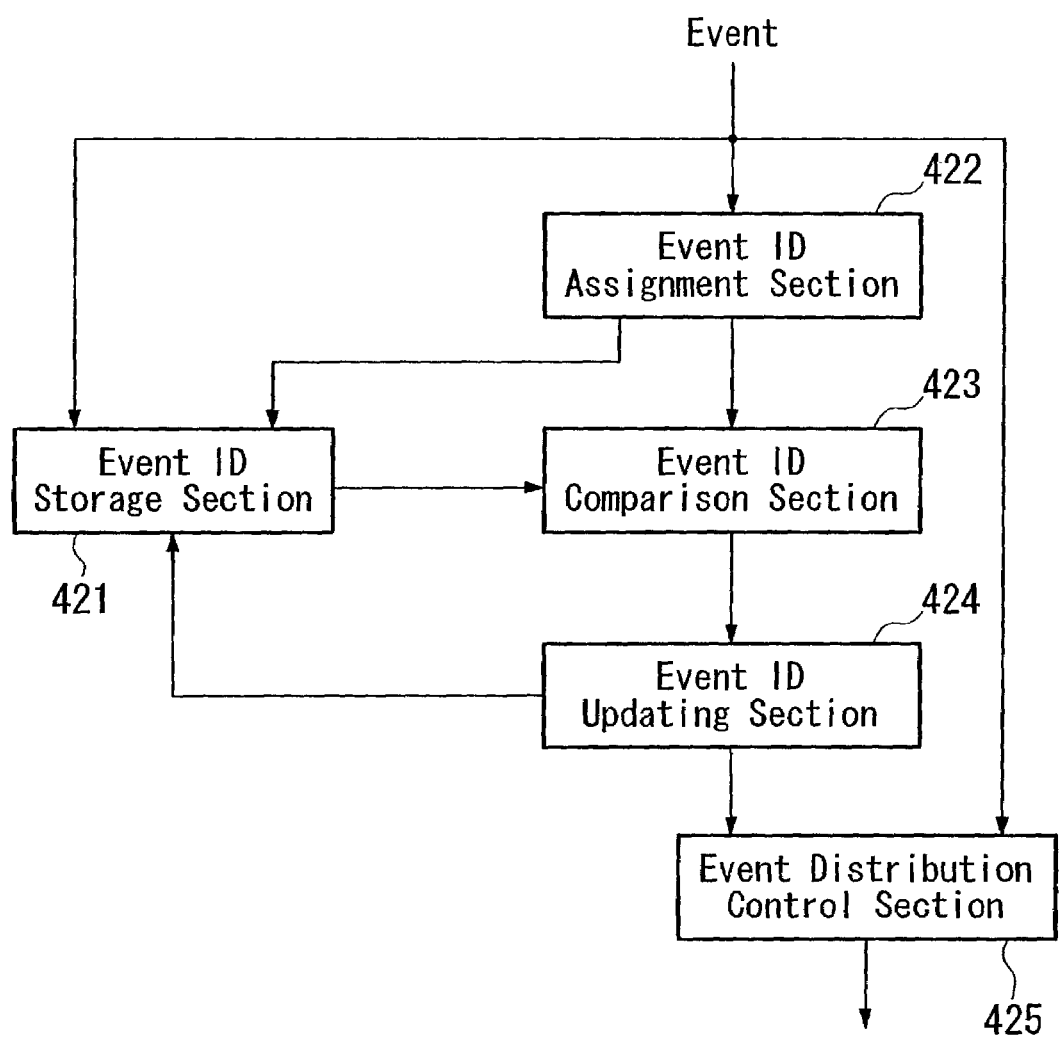

FIG. 31 is a block diagram showing the internal structure of a highly reliable event delivery apparatus that operates event routing.

Figure 32:
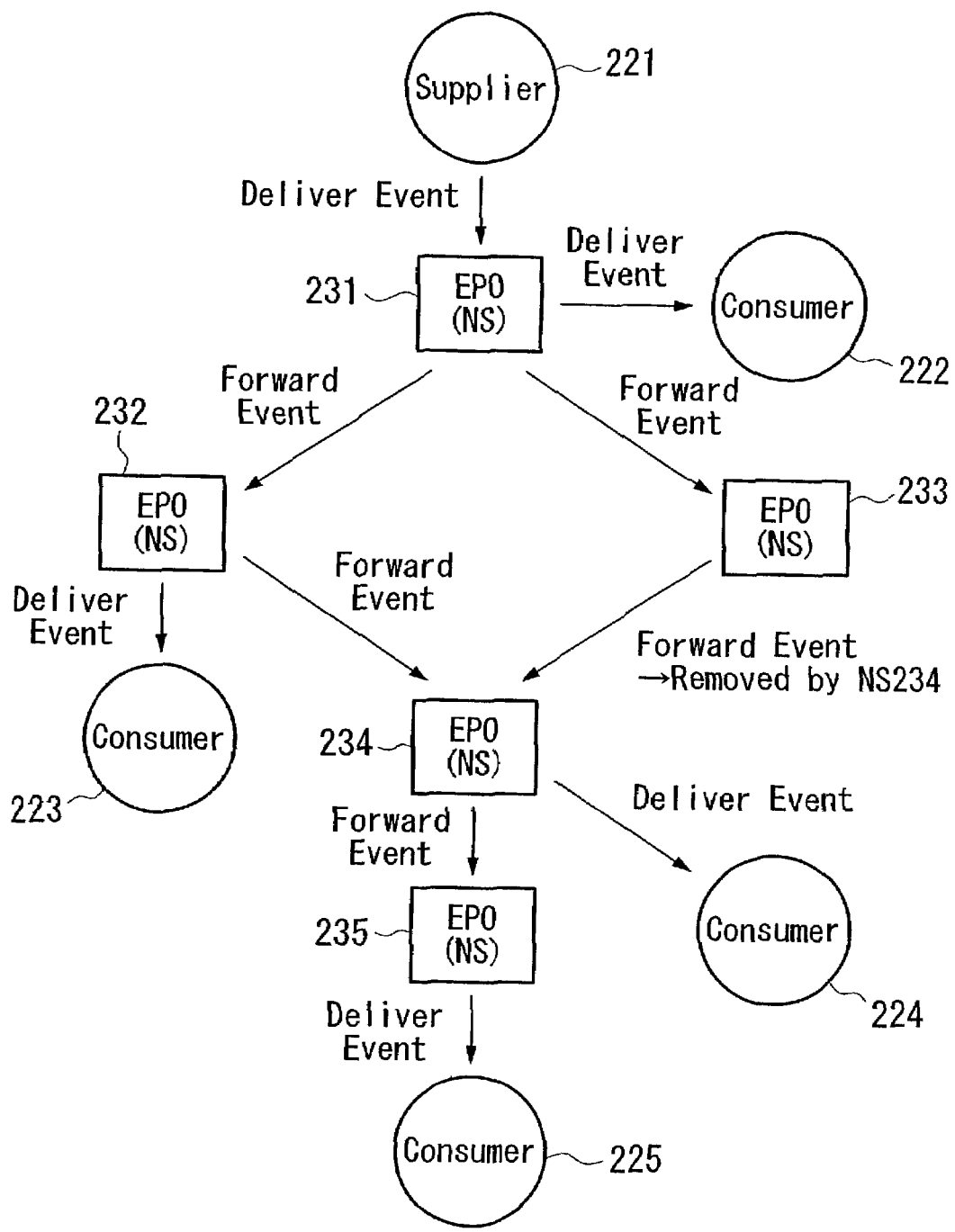

FIG. 32 is a diagram showing an event routing procedure expanded on a network tree.

Figure 33:
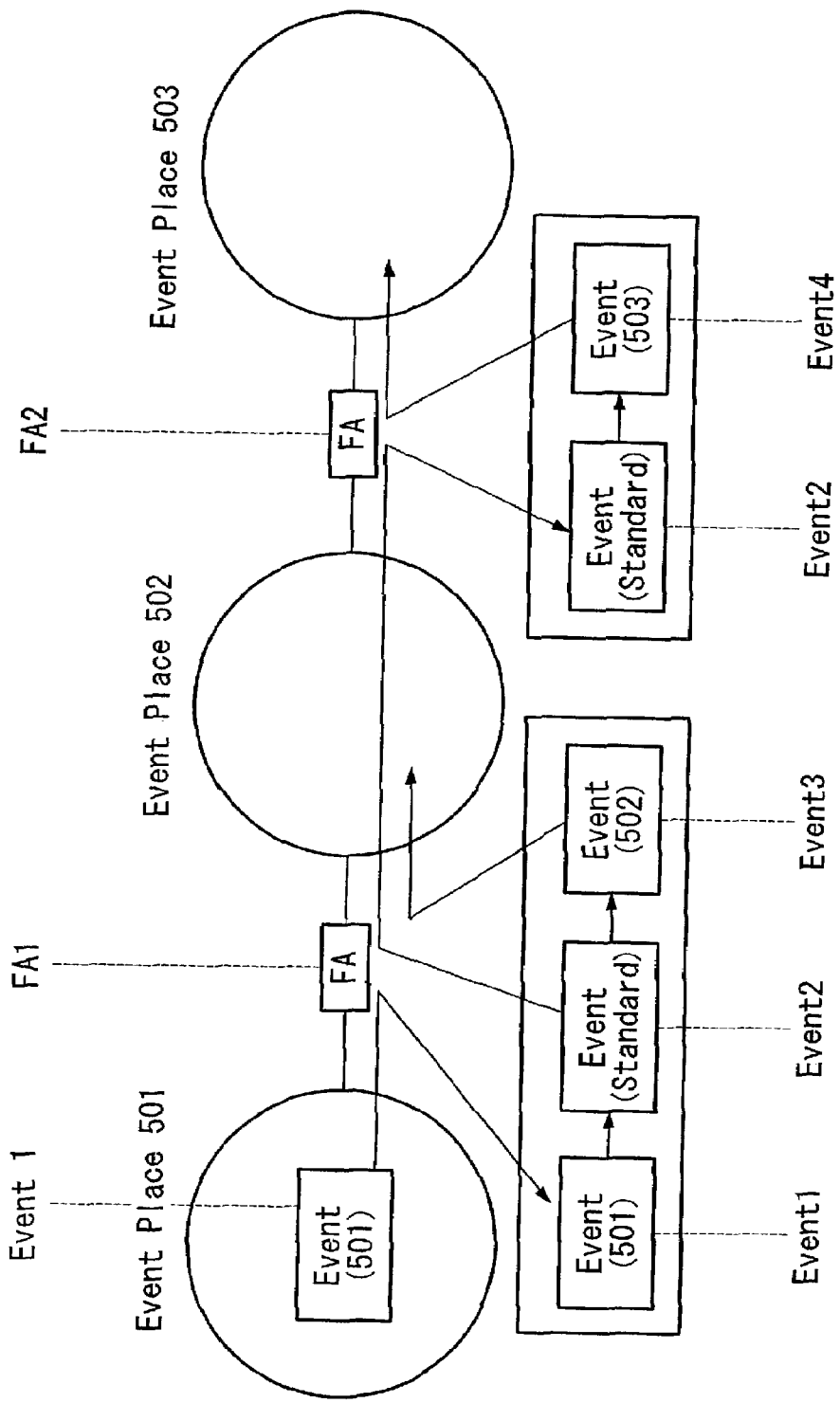

FIG. 33 is a diagram to explain a first ontology conversion method.

Figure 34:
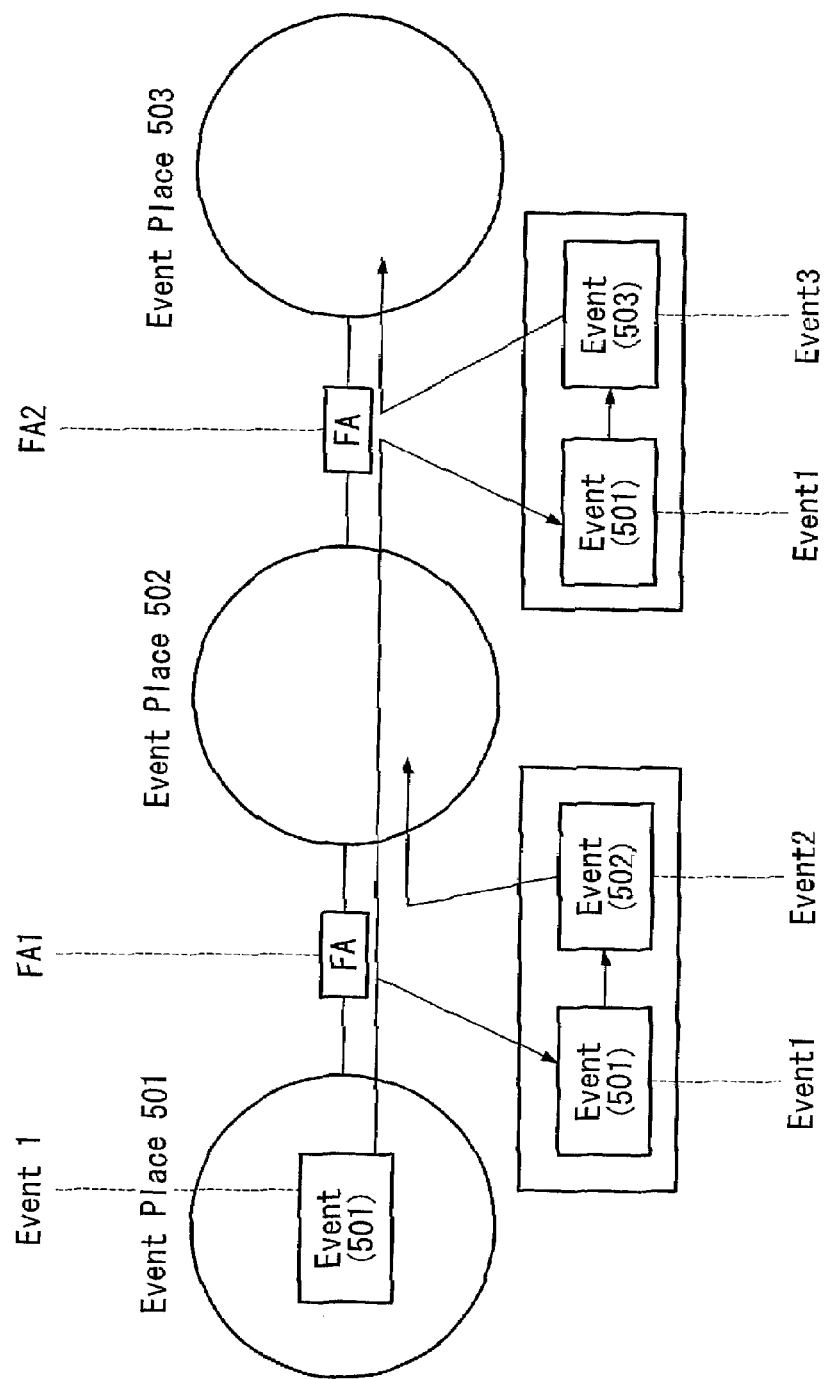

FIG. 34 is a diagram to explain a second ontology conversion method.

Figure 35:
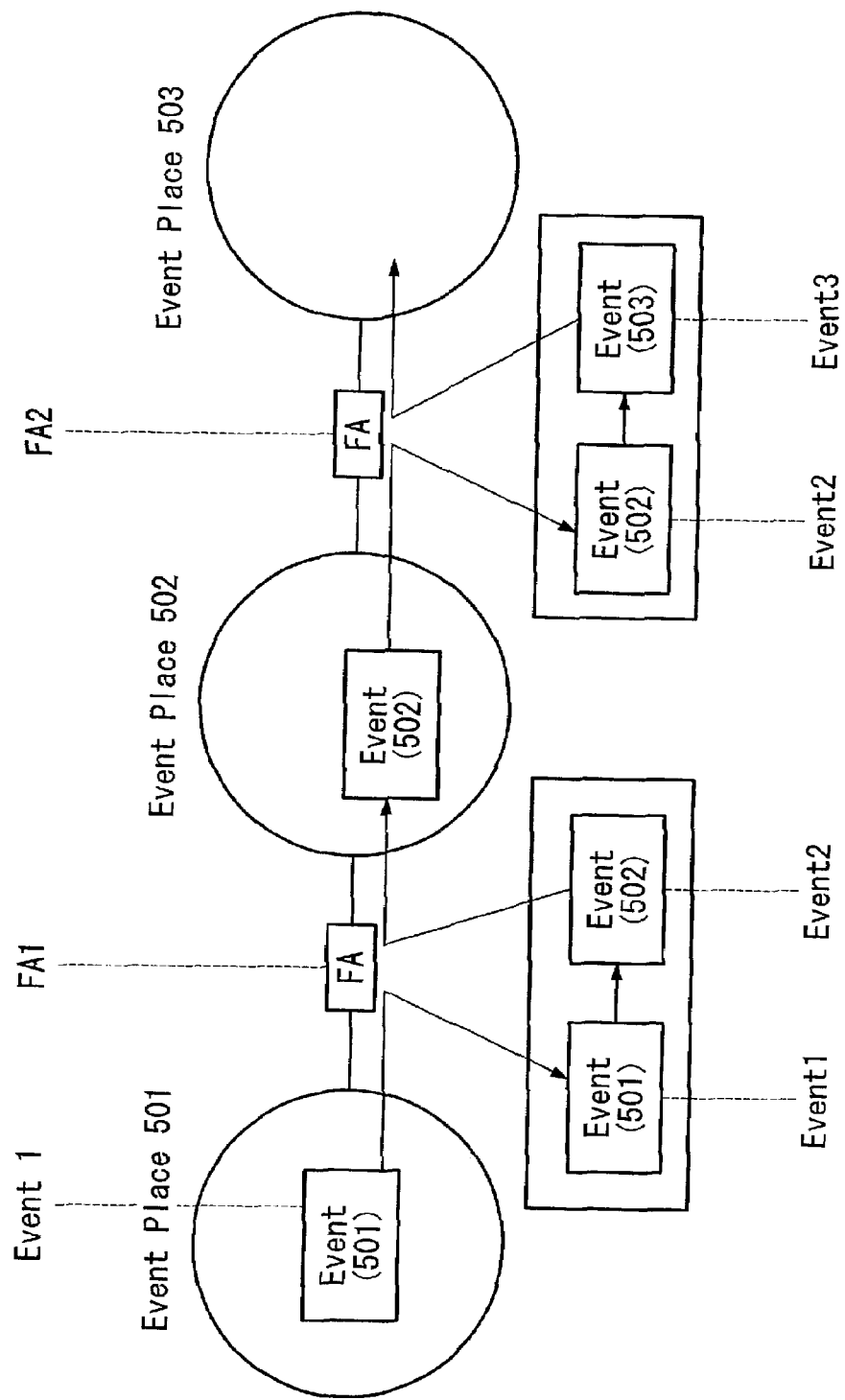

FIG. 35 is a diagram to explain a third ontology conversion method.

Figure 36:
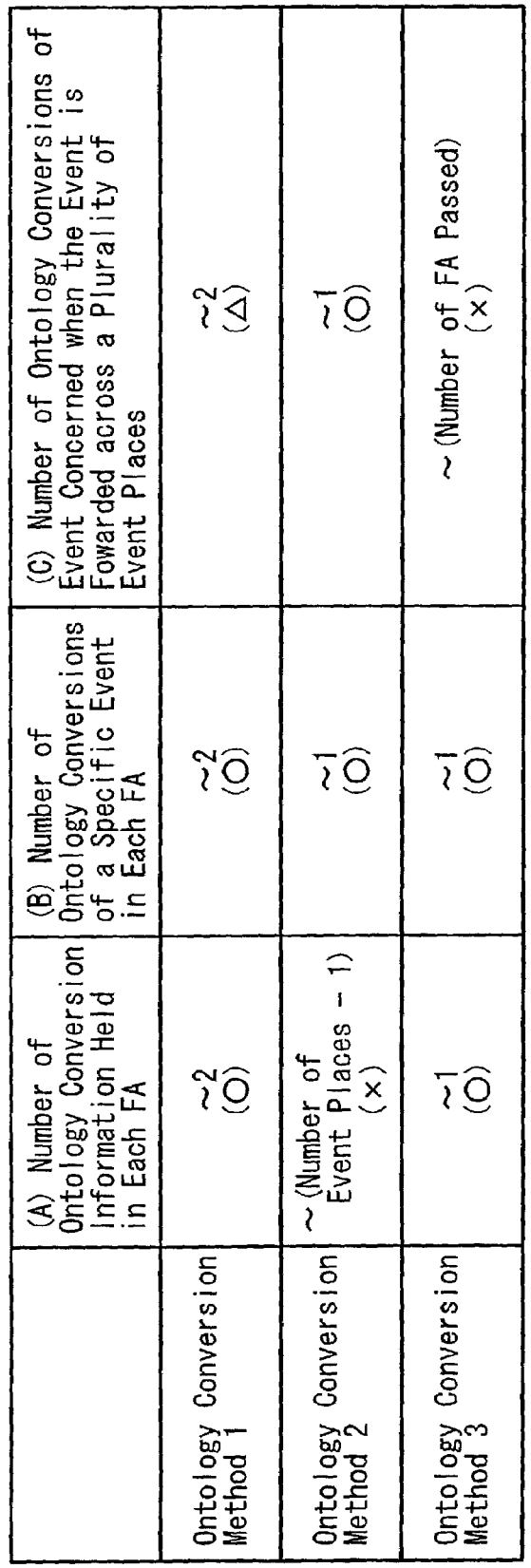

FIG. 36 is a diagram showing a comparison of the ontology conversion methods.

Figure 37:
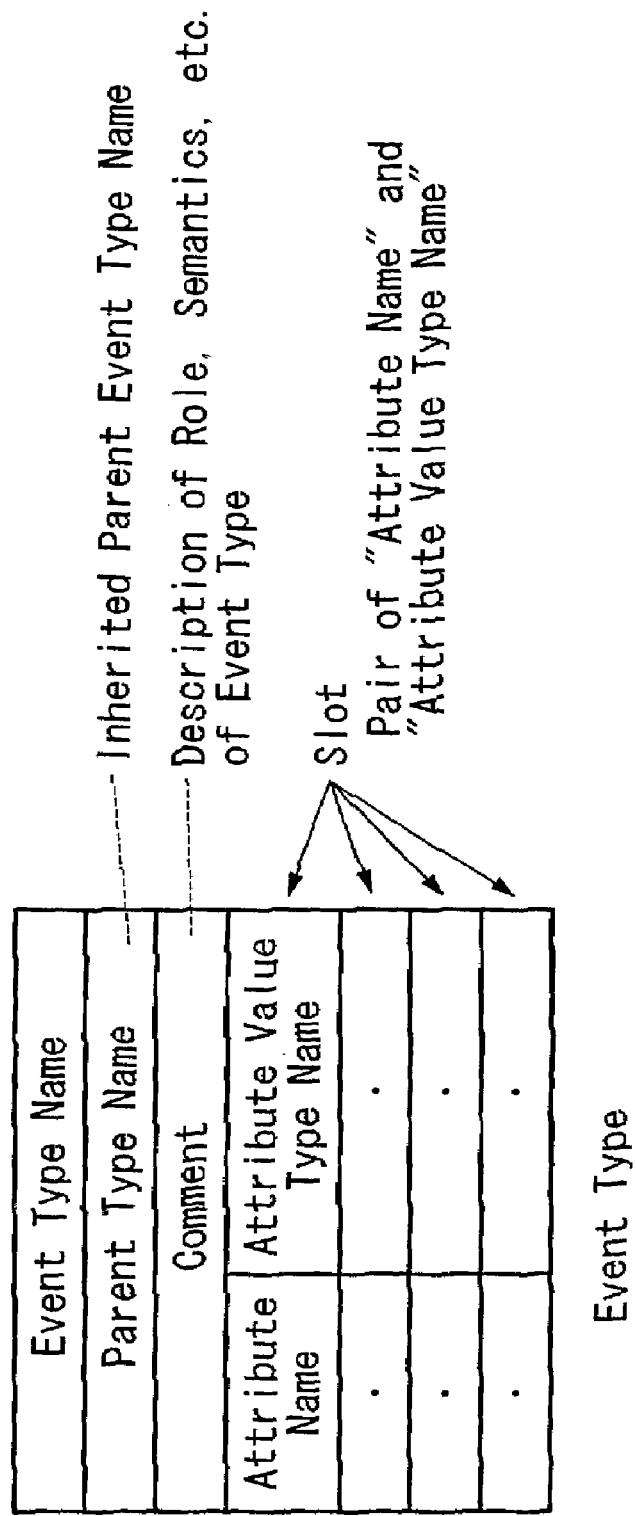

FIG. 37 is a diagram showing a structural example of an event type.

Figure 38:
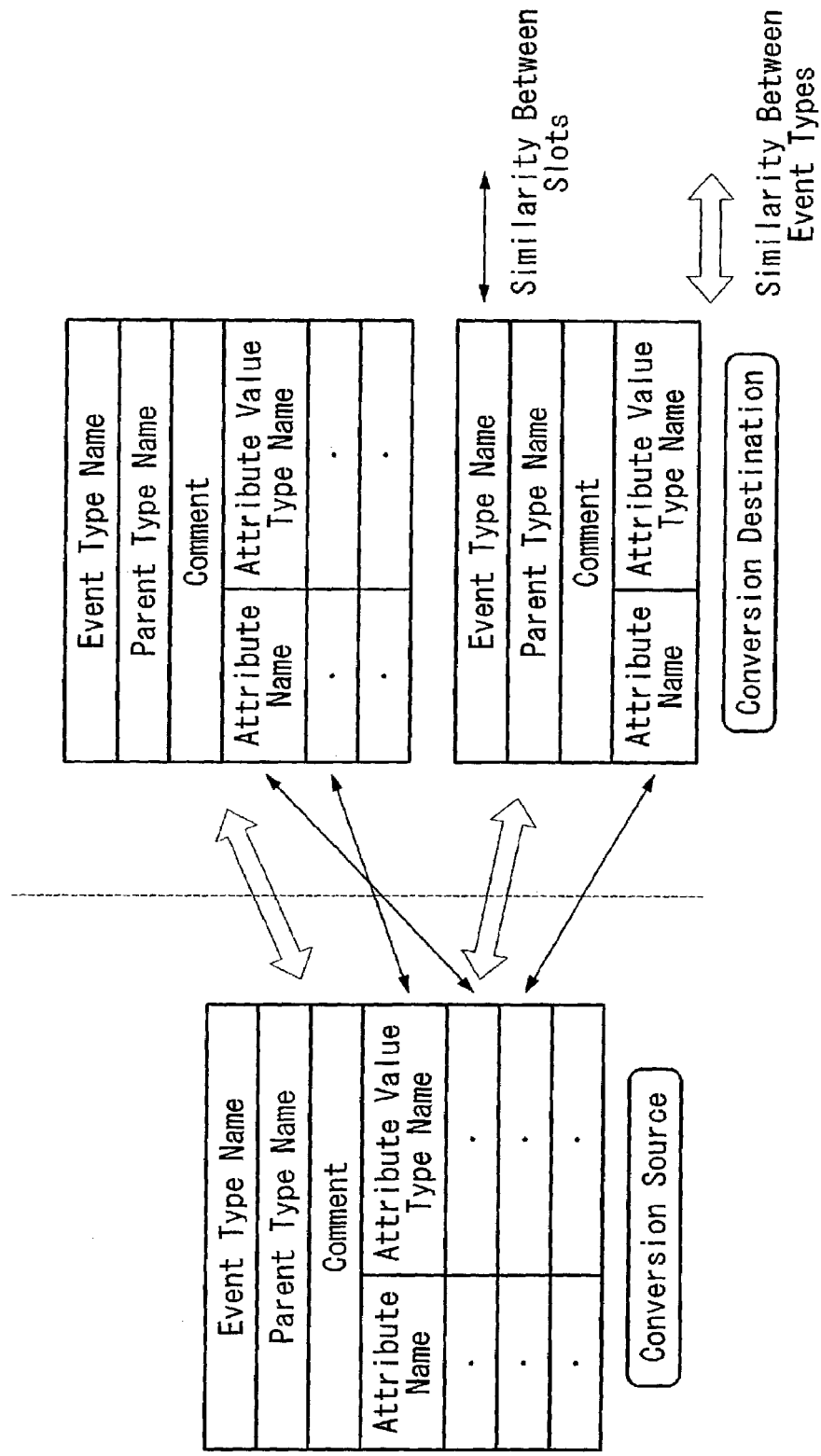

FIG. 38 is a diagram that explains correspondences of event types and slots.

Figure 39:
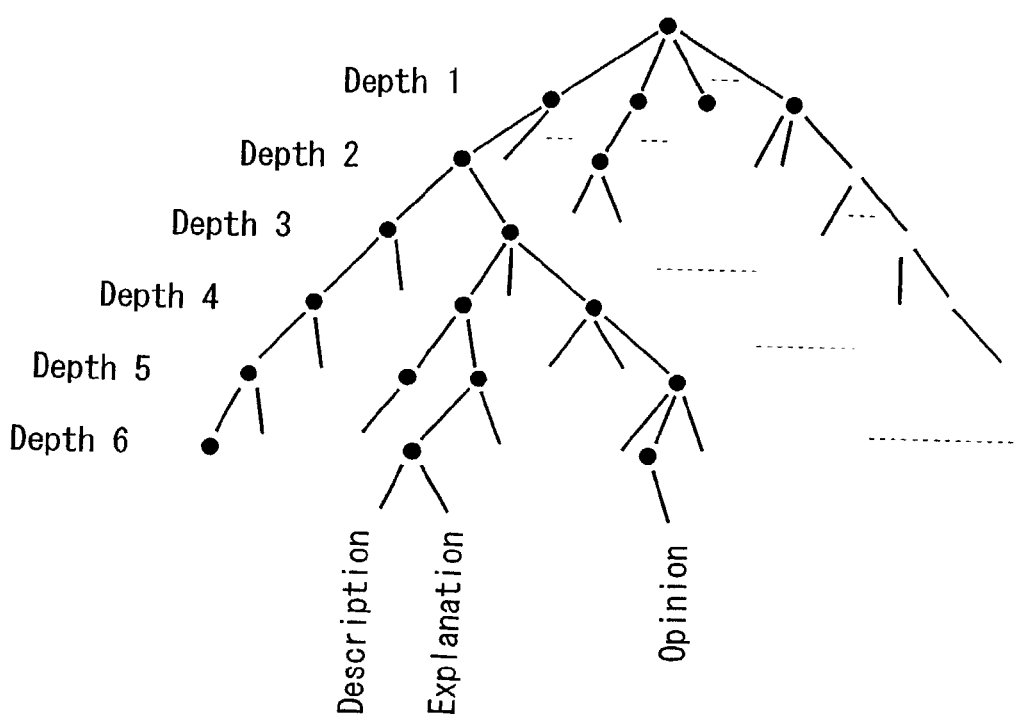

FIG. 39 is a diagram to explain a category thesaurus.

Figure 40:
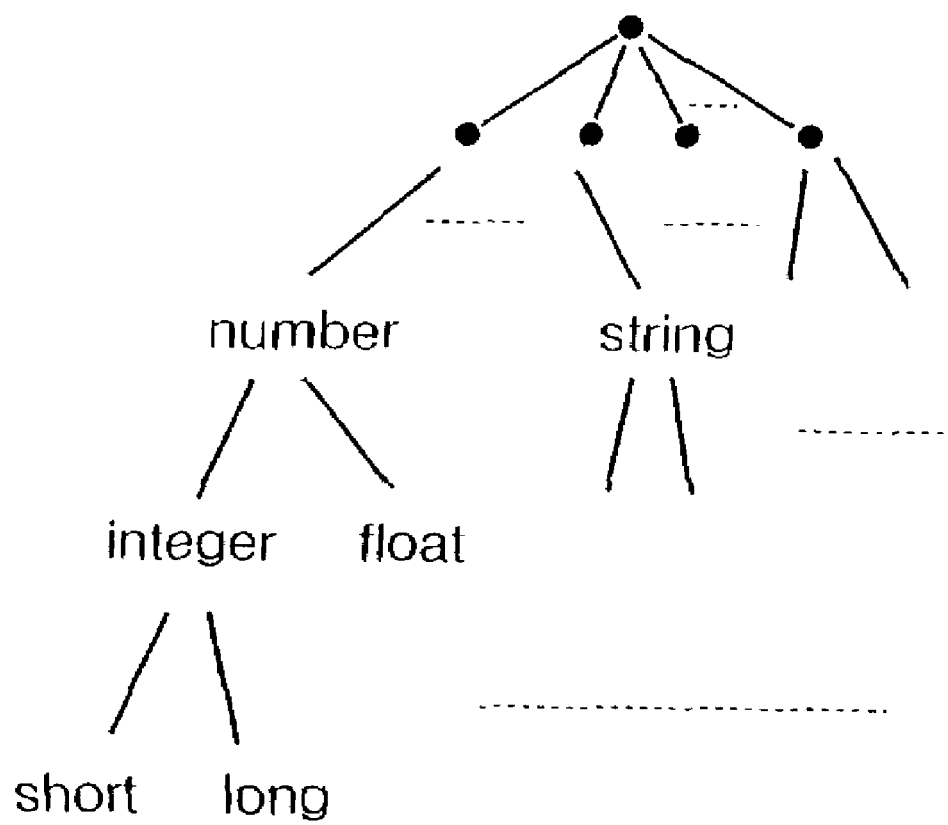

FIG. 40 is a diagram showing one example of a tree having attribute type names as elements.

Figure 41:
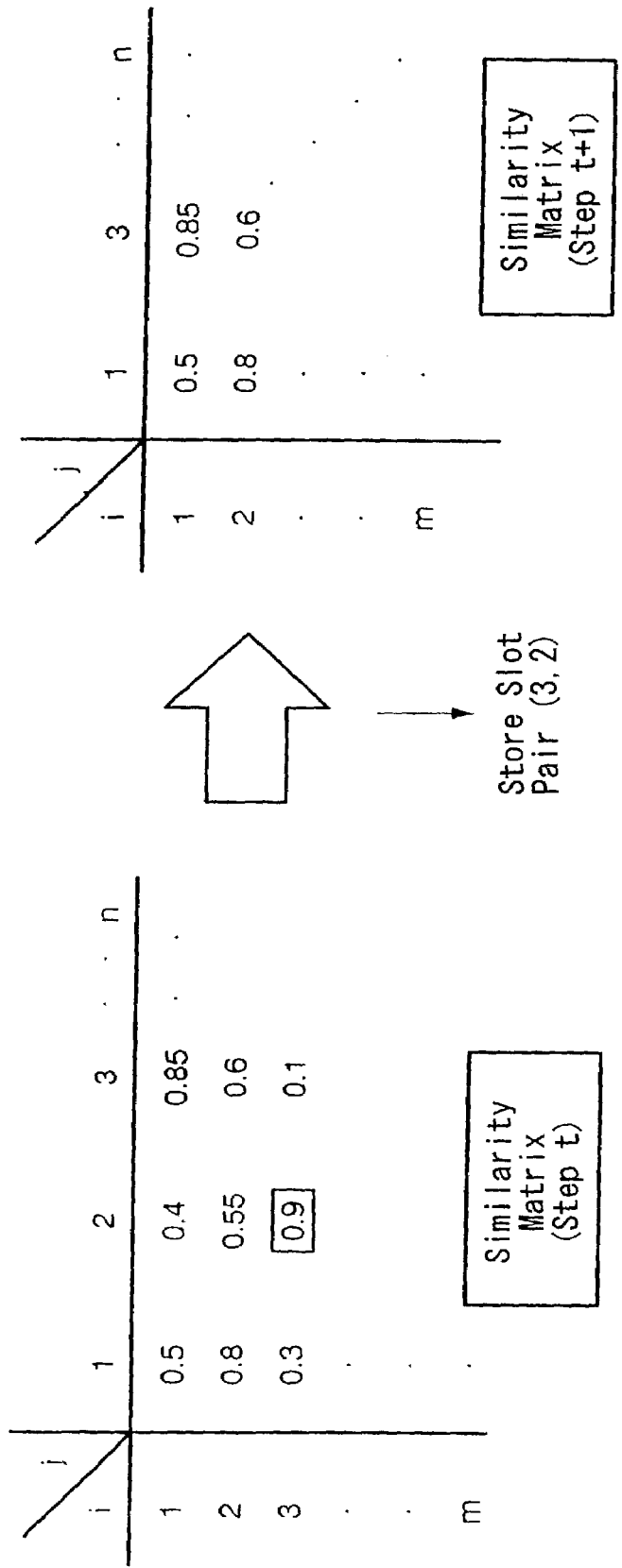

FIG. 41 is a diagram to explain the determination of slot correspondence.

BEST MODE FOR CARRYING OUT THE INVENTION

As follows is a description of an embodiment of the present invention with reference to drawings.

<Semantic Information and Semantic Information-oriented Network SION>

Figure 1:
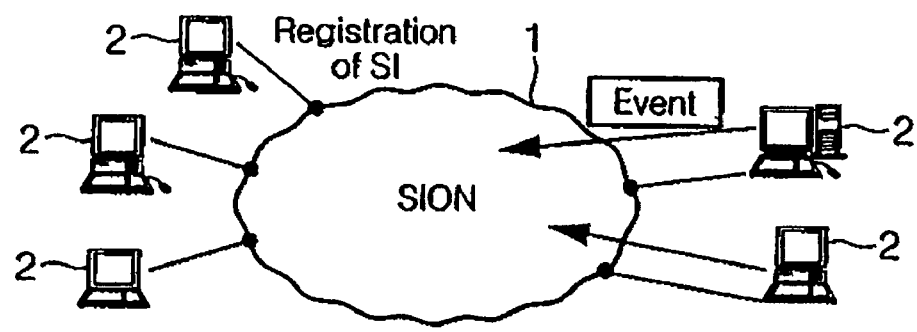
FIG. 1 is a block diagram showing a structure of an embodiment of the present invention.
Figure 2:
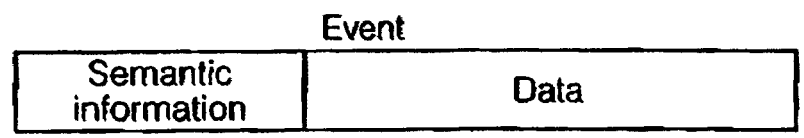
FIG. 2 is an explanatory diagram showing the structure of an event.

Firstly, the outline of a semantic information-oriented network (Semantic Information-Oriented Network, abbreviated hereunder to SION) will be described. SION is a network that can deliver an event to a destination based on semantic information. FIG. 1 shows a conceptual model of SION. In FIG. 1, each terminal 2 registers semantic information (Semantic Information: SI) on SION 1. On the other hand, when a terminal 2 sends an event, it sends an event comprising semantic information and data as shown in FIG. 2 to the SION 1. The semantic information here is a description of the characteristics of the data contained in the event, and evaluated as meta information of the data. For example, semantic information uses expressions such as:

Deliver data to "people who live in Tokyo"

Deliver data to "people who are interested in classical music"

Deliver data to "people who have communication environment over 1 Mbps"

Deliver data to "people who are passing through Mejiro Ave."

Deliver data to "content providers that have content matching a keyword (for example, travel)"

SION is an autonomous decentralized meta network that can determine a target to deliver data (terminal, person, software or the like) dynamically, and deliver and notify the data to a specified target.

Figure 21:
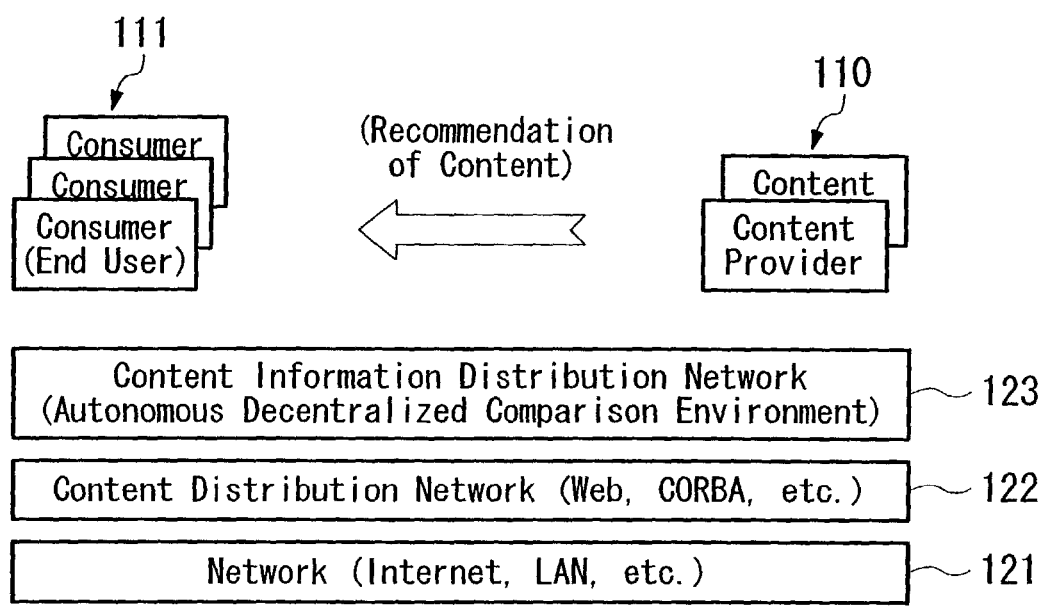
FIG. 21 is an explanatory diagram of a position of a content information delivery network.

FIG. 21 shows the position of SION (a content information delivery network (autonomous decentralized comparison environment) 123 in the drawing). By using SION, it is possible for information providers (content providers 110 in the drawing) to directly recommend their own information only to users (consumers (end users) 111) to whom it is appropriate to provide it without using a broker (often achieved as a third party service provider). Furthermore, it is also possible to achieve a multicast type comparison in contrast to the conventional broadcast type comparison.

Such a business model that enables peer-to-peer information recommendation without broker intervention (brokerless model) is here called an order taking model (or order taking information recommendation model). Similarly, real time information search is also possible in which information that a user wants can be searched directly without using a search service (broker). This business model is called an inquiry model in contrast to an order taking model. The difference between the two is the difference in event direction.

In FIG. 21, SION is an imaginary network with a purpose of performing a comparison of content information in order to build an order taking society on a network 121, and is located on the upper layer of a content delivery network 122. Here, as an order taking information recommendation service, it can be used for the following services.

(1) Manufacturing company: send product information targeting customers who seem to have an interest in its products.

(2) Advertiser: send a personalized advertisement to each customer.

(3) Barter: buy, sell and exchange products based on agreements among users.

The kind of information in an event data part depends on the service. A range of forms is possible, for example such as substance of information, references for information (URL, distributed object identifier and the like), proxies (Jini proxy and the like), and mobile agents.

Next is a detailed description of SION.

<SION Architecture>

Figure 3:
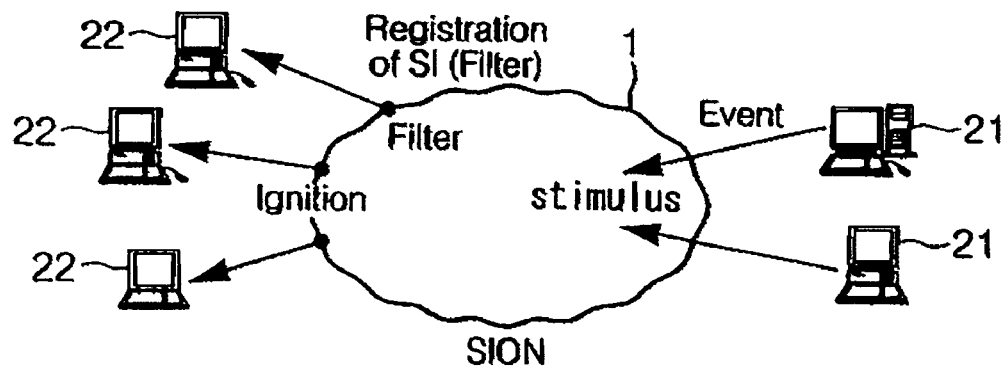
FIG. 3 shows a model of a semantic information-oriented network.

First is a description of the SION network architecture. FIG. 3 shows a network model of SION. Here, for convenience of description, terminals 2 are divided into event senders designated as send terminals 21 and event receivers as receive terminals 22.

Figure 4:
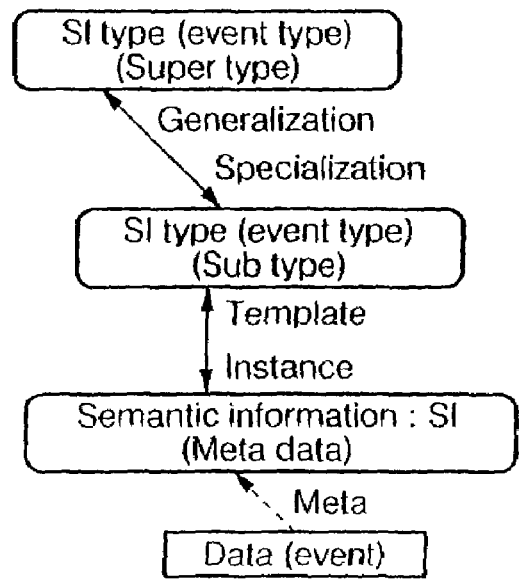
FIG. 4 is an explanatory diagram showing a definition of semantic information.

An event receiver who wants to receive an event using a receive terminal 22, registers semantic information of the event as metadata in SION 1. This is called a filter. On the other hand, an event sender gives a stimulus to SION by sending an event to SION 1 using a send terminal 21. This event comprises semantic information, in which the characteristics of the event are described, and data, as shown in FIG. 2. FIG. 4 shows a definition of semantic information. Semantic information is metadata of an event, and also an instance of a semantic information type (event type).

SION is an autonomous decentralized comparison network for comparing (filtering) an event sent from an event sender with filters registered by event receivers. As a result of a comparison, a filter through which an event has passed (event reacted) is ignited, and the receive terminal 22 of a corresponding event receiver is activated autonomously. By this mechanism, it is possible to search out and discover a terminal 2, being a target among an unspecified number of terminals 2.

Figure 5:
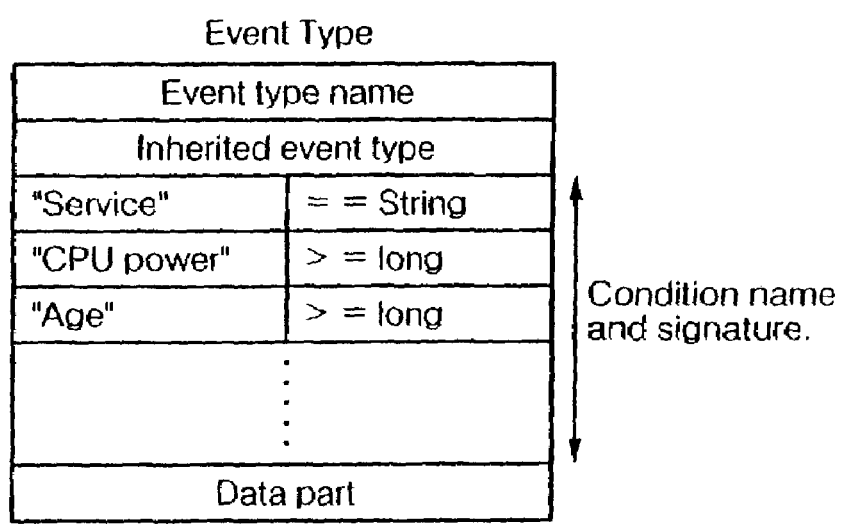
FIG. 5 is an explanatory diagram showing an example of a definition of an event type.

Next is a description of an event type. FIG. 5 shows a definition example of an event type, being a template of an event. Here, an event type can also be mentioned a template of semantic information from the relationship between an event and semantic information. As shown in FIG. 5, an event type is the definition of an event type name (Event type name), condition names (corresponding to "Service" and "CPU power" in FIG. 5), data types (corresponding to String and long) for each condition name, and conditional equations (corresponding to == and >=). An event type name is a name that uniquely identifies the event type.

Here, it is also possible to inherit a parent type of an event type by assigning a value to inherit an event type name as an "Inherited event type" item.

As shown in FIG. 6, an event is ignited according to the data structure of an event type. An event comprises a combination of an event type name, condition names and condition values, and a data part. If the condition name, the conditional equation, or the condition value does not match the event type, it creates an error. However, a condition name used in an event may be a subset of the event type.

FIG. 7 shows an example of a filter definition. A filter comprises permissible event type names, and pairs of attribute names (corresponding to "CPU power" and "Age" in FIG. 7) and attribute values (corresponding to 200 and 25 in FIG. 7). Only events belonging to the event types defined by the permissible event type names may be targets of filtering. Here, it is possible to define a plurality of event type names, and further it is also possible to target all events by assigning a wildcard (*.*). Here, if an attribute name defined by a filter does not exist in the condition names of event type defined by the permissible event type name, it creates an error. However, a subset of event types is also permissible.

Figure 8:
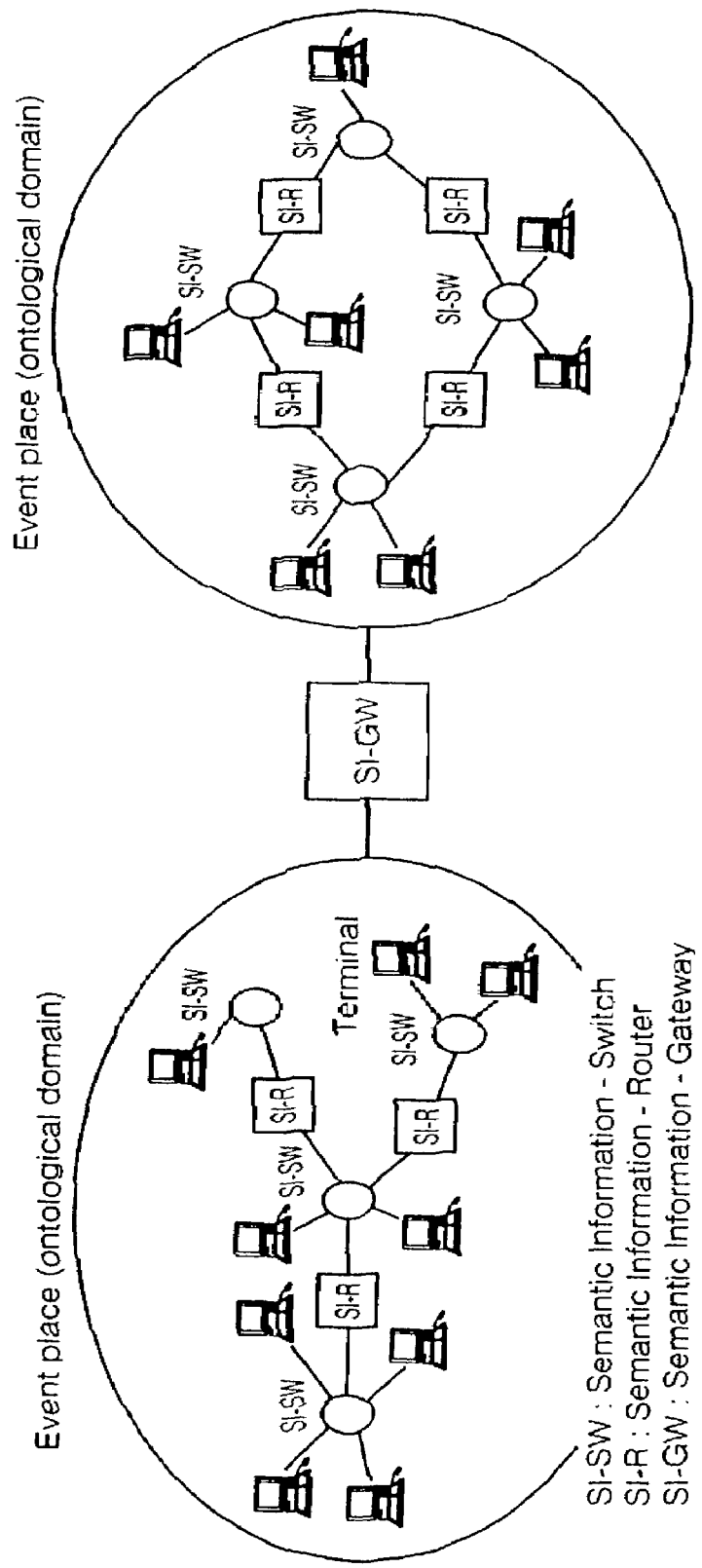
FIG. 8 is a diagram showing the structure of a semantic information-oriented network.

Next is a description of the structure of SION. FIG. 8 shows the structure of SION 1. As shown in FIG. 8, SION comprises semantic information switches (Semantic Information-Switch, shown as SI-SW in the figure), semantic information routers (Semantic Information-Router, shown as SI-R in the figure), and semantic information gateways (Semantic Information-Gateway, shown as SI-GW in the figure).

Semantic information switches (SI-SW) provide a switching mechanism for comparing semantic information registered as filters and semantic information assigned to an event, and activating the terminal 2 of an ignited event receiver as a result. Semantic information switches (SI-SW) and terminals 2 are combined in a star configuration.

A semantic information router (SI-R) routing an event between semantic information switches, and also plays a role of forwarding an event sent from the terminal 2 to a semantic information switch to another semantic information switch. This is achieved by dynamic event routing based on semantic information.

A semantic information gateway (SI-GW) forwards an event between event places (EP: Event Place). An event place provides a place for comparing events, is the smallest unit (ontology domain) required to guarantee a common semantic information space, and limits event delivery range. An event place being an ontology domain means that in the event place, the uniqueness of an ontology system such as the name, concept, vocabulary, semantics, relationship and the like of an event type is guaranteed, and semantic information is described based on a common ontology, so that there is an effect of preventing an increase in event categories. By limiting the delivery range of an event, it is possible to prevent an increase to a scale such as sending the event to all host terminals connected to a network 121 and a content delivery network 122 in FIG. 21. It is possible to create an event place for each administrator, security, service, physical subnet and the like.

In principle, an event sent from the terminal 2 of an event sender is delivered only inside the event place. However, using a semantic information gateway (SI-GW), it is possible to deliver events to other event places having different ontology systems. At this time, the semantic information gateway (SI-GW) forwards an event to a different event place after converting the ontology of the event.

<Entities Using SION: UA and CA>

Figure 22:
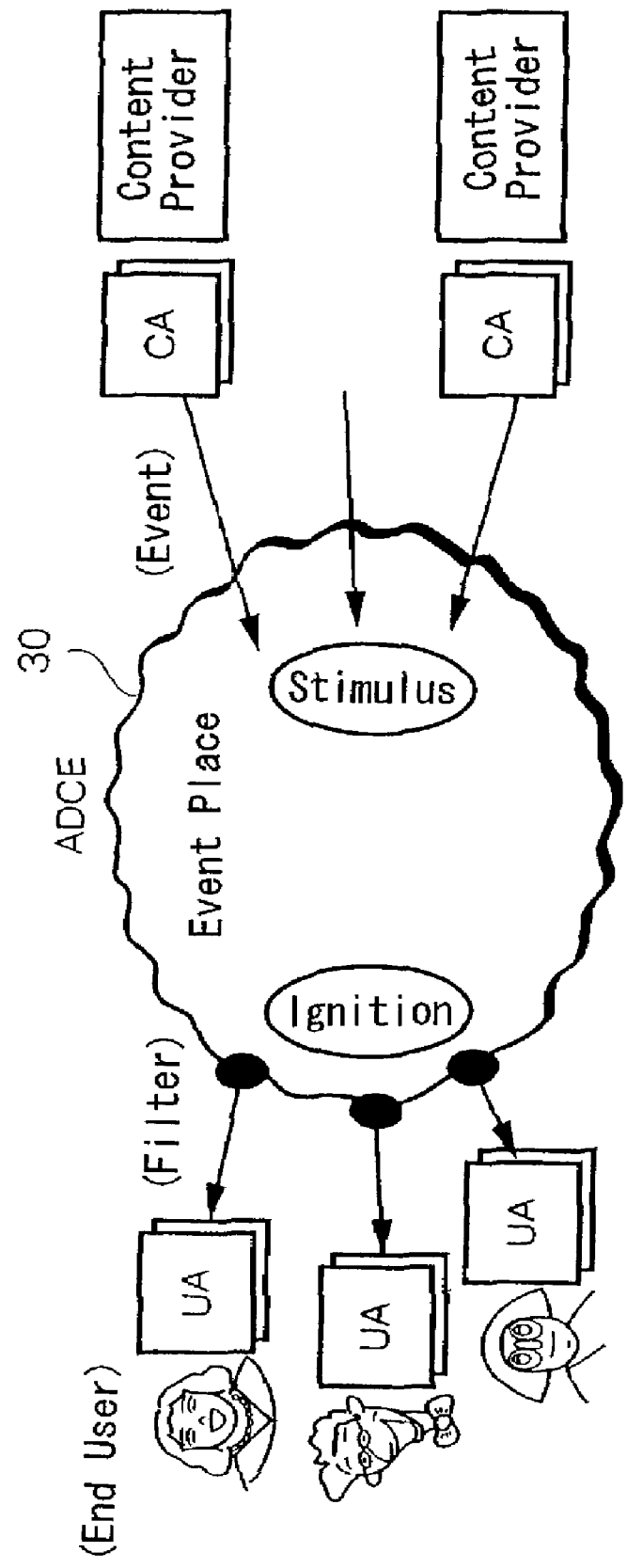
FIG. 22 is a conceptual diagram of a content information delivery network according to an embodiment of the present invention.

Using FIG. 22, entities (UA and CA), which operate on SION, will be described as examples of SION usage.

(1) User Agent (UA)

A user agent UA is an agent of an end user, which is regarded as one entity using SION. A UA becomes an event sender or an event receiver depending on the type of operation (order taking, inquiry). As mentioned before, for example, in the case of an event receiver, end user preference information based on the preferences of an end user is registered in the event place as a filter.

(2) Content Agent (CA)

Similarly to the relationship between an end user and a UA, a content agent CA is an agent of an information provider (content provider), which is one entity using SION. A CA also can be either an event sender or an event receiver. For example, in the case of an event sender, it sends an event with content keywords (content information) as the semantic information of the event, and with a content identifier as the data of the event. Here, CAs are divided into two main types of usage. One is a CA used from the situation of a service provider (content information provider), and the other is one as an information provider. The latter is used as a method for an information provider itself to easily become a content information provider.

(3) Place of Comparison, Event Receiver and Event Sender

For a CA, an event sender, and a UA, an event receiver described in this example, an EP provides a place for comparing an event sent from a CA with a filter registered by a UA. In this manner, a CA initiative order taking comparison can be achieved. Each of the UAs activated can access its desired content independently using a content identifier obtained as an event.

Figure 23:
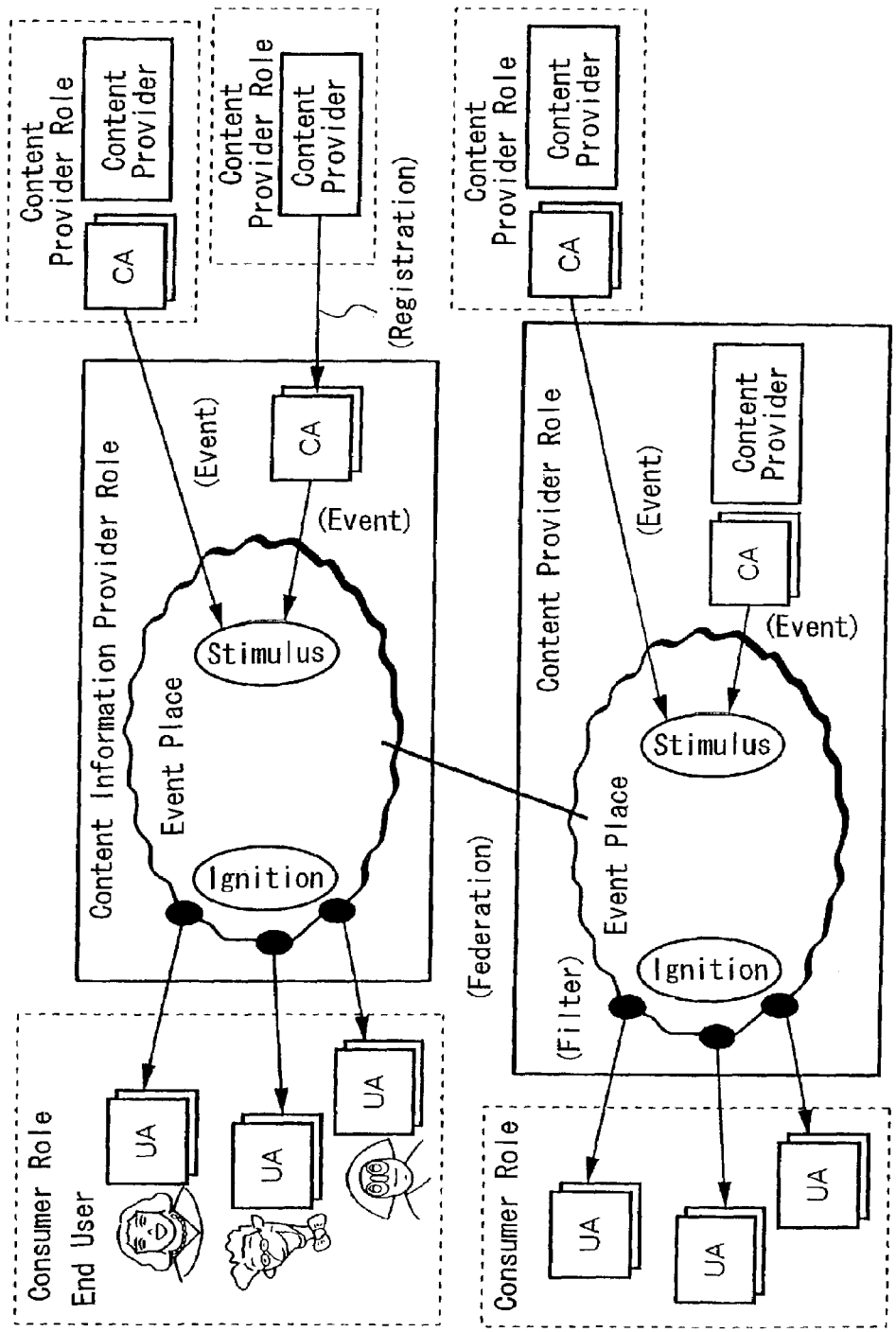
FIG. 23 is a diagram showing a business model of an autonomous decentralized comparison environment (SION).

Here, it is also possible to easily achieve a UA initiative inquiry comparison using SION by registering a content keyword as a filter by a CA, while sending end user preference information as an event by a UA. Furthermore, FIG. 23 shows a business model of SION. SION is basically operated by service providers (content information providers) or content providers.

<Examples of Events and Filters>

Examples of the use of filters and events in SION will be described.

(1) End User Preference Attributes and Content Conditions

A case is considered where content information is delivered by SION. That is, it is a case where information to be used is content information, and also a case where an end user receives content, and an information provider sends an event. Content information is described by content conditions, and user preference information by user preference attributes. Content conditions means a definition of the conditions of an end user (UA) appropriate to the content to be provided, and can be described as in FIG. 24, for example.

On the other hand, end user preference attributes means a definition of the characteristics of a user (UA), and can be described as in FIG. 25, for example. Conventionally, it is usual to use content information as content attributes, and end user preference conditions (search conditions) as end user preference information. However, the expression mentioned above is newly defined since, for an order taking model where a content provider provides content only to a really appropriate end user, the method of describing the conditions of an appropriate end user in content information, and for describing the attributes of a UA in end user preference information, is more compatible with an order taking comparison compared with the conventional type.

(2) Definition of Events and Filters

A content agent CA sends content conditions as an event. This event creation procedure is described as follows.

Firstly, as shown in FIG. 5, an event type, a template, is defined. Here, an event type name is a name for identifying the event type uniquely. Furthermore, it defines condition names, and data types and conditional equations for the condition names.

The event type is registered in an event place. An event is ignited according to the data structure of the event type (refer to FIG. 6). An event comprises a combination of an event type name, condition names and condition values. Furthermore, a content identifier is defined in the data part.

The event is sent to the event place. Here, if the condition names and conditional equations defined in the event do not match the event type, it creates a send error. However, the condition names used in the event may be a subset of the event type.

On the other hand, a user agent UA registers user preference attributes in the event place as a filter. This filter creation procedure is described as follows.

A filter is defined as shown in FIG. 7. A filter comprises permissible event type names, and pairs of attribute names and attribute values. Only events belonging to the event types defined by the permissible event type names may be targets of filtering. Here, a plurality of event names can also be defined, and furthermore by assigning a wildcard (*.*), it is possible to enable all events as objects.

The filter is registered in the event place. Here, if an attribute name defined in the filter does not exist in the condition names in the event type defined by the permissible event type name, it creates a register error. However, it may be a subset of the event type.

<Operating Mechanism and Interface Specification>

As an example of a method for achieving SION 1, an achieving method using a distributed object technique is shown. Here, SI-SW, SI-R, and SI-GW are achieved as distributed objects called event place objects (EPO), shared link objects (SLO) and federation agents (FA) respectively. The operating mechanism and control interface of SION 1 are described in detail using FIG. 9, FIGS. 26 and 27. Furthermore, it is possible to use a network interface of SION 1 by using a SION-MT (Management Tool) and a SION interface. Moreover, it is possible to easily remove, increase or decrease EPOs, dynamic change physical link information, migrate a PO (dynamic change of EPO which is bound by a PO), collect ignition rate, collect statistical information of favorite information or popularity information, and the like.

Figure 9:
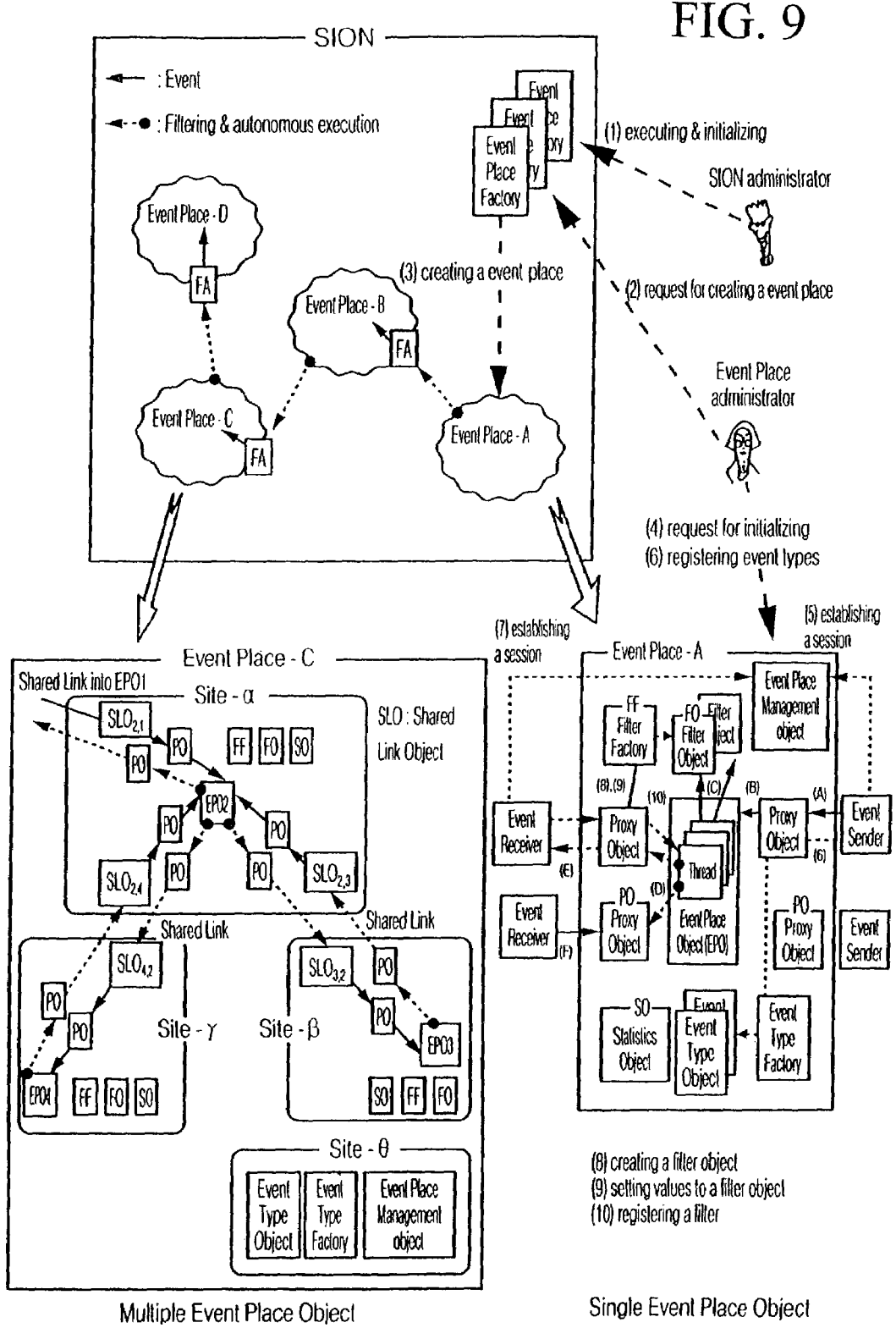
FIG. 9 is an explanatory diagram showing an operating mechanism and control interface of a semantic information-oriented network.
Figure 26:
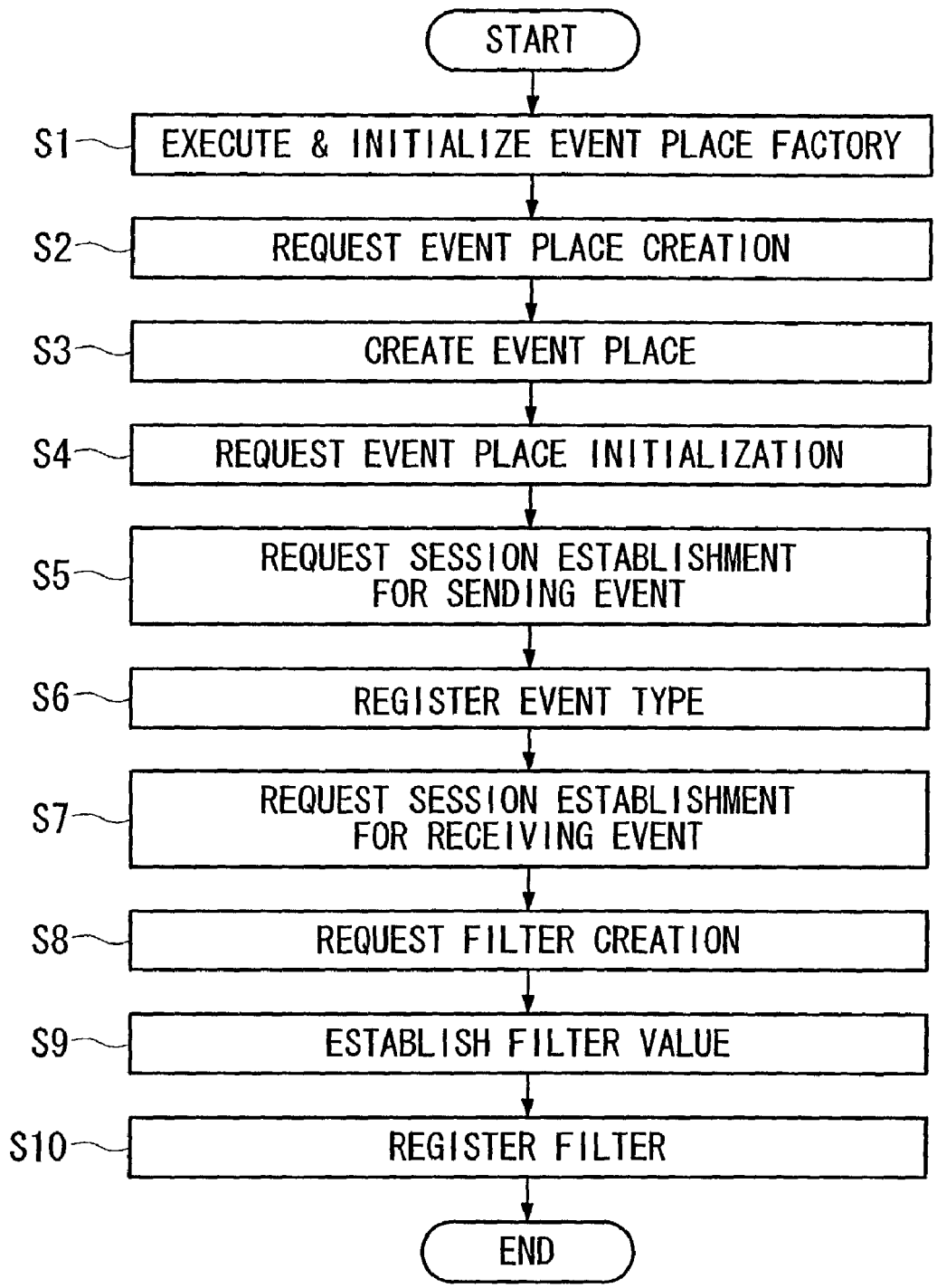
FIG. 26 is a flow chart showing a processing mechanism of an autonomous decentralized comparison environment (SION).

Executing & Initializing Event Place Factory (FIG. 9(1), Step S1 of FIG. 26)

Firstly, a SION administrator activates an event place factory (EPF) on an arbitrary host, and subsequently, initializes the EPF. At this time, it provides the EPF with the name of a host that can create an event place (EP), and a storage area of executable files for the EP. These are called event place creation information. A SION administrator corresponds mainly to an information provider or a service provider (content information provider such as Yahoo).

Request for Creating Event Place (FIG. 9(2), Step S2 of FIG. 26)

Next, a person who creates an EP (hereunder, EP administrator) requests the EPF to create an EP. At this time, it gives the EP name, and EP attributes as parameters of the request to create the EP. Here, the EP attributes indicate for which one of the purposes, order taking model or inquiry model, the created EP is to be used, and indicates the direction of event flow.

Creation of Event Place (FIG. 9(3), Step S3 of FIG. 26)

Next, on receiving the request to create an EP, the EPF creates an EP. To say specifically, at this time an event place management object (EPMO) is created for managing the EP. That is, a request for EP processing has the same meaning as a request for EPMO processing. The EPF returns an identifier of the EP (that is, EPMO) created to the source of the creation request. Here, the EPMO is created on a host dynamically determined from among the hosts capable of creating an EP, specified in FIG. 9 (1) (step S1 of FIG. 26). For a method of determining a host on which an EPMO is invoked, it is possible to select a method such as determining it cyclically, determining it according to traffic, assigning it explicitly, or the like.

Request for Initializing Event Place (FIG. 9(4), Step S4 of FIG. 26)

Next, the EP administrator requests the EPMO to initialize the EP. At this time, it assigns a single event place object or multiple event place objects. Furthermore, it provides a host capable of creating event place objects and the like, and a storage area of an executable file such as an event place object or the like. This is called event place object creation information. Here, in the case where this is omitted, event place creation information is used.

Multiple event place objects are used with a purpose of improving scalability by delivering the load of event comparison processing in an event place. In the case where multiple event place objects are assigned, it is necessary to provide physical link information (topology) of the event place objects (EPO) at the same time. Here, the physical link information of an EPO indicates which other EPOs any given EPO is aware of the existence of.

Figure 10:
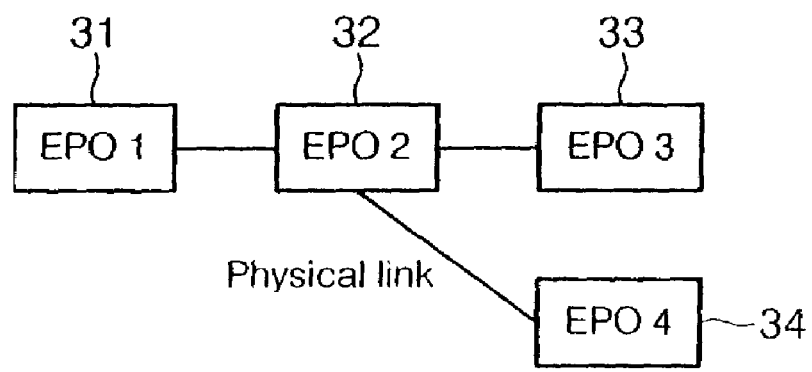
FIG. 10 is an explanatory diagram showing a physical link.

For example, FIG. 10 shows that an EPO 2, 32, is aware of the existence of EPO 1, 31, EPO 3, 33, and EPO 4, 34, but the EPO 3, 33, is only aware of the existence of EPO 2, 32. Having multiple EPOs aims towards improving scalability by delivering the load of event comparison processing in an EP.

An EPMO dynamically determines a host on which to create an EPO from among a list of hosts capable of creating an EP, assigned in FIG. 9(1) (step 1 of FIG. 26), and creates an EPO there. At this time, one filter factory (FF) and one statistical information collection object (SO) are always created simultaneously in each EPO, and these correspond to SI-SW. Furthermore, depending on the number of physical links, a shared link object (SLO) is created simultaneously with each EPO. For example, three SLOs are created for an EPO 2 (corresponding to SLO2,1, SLO2,3, SLO2,4 in FIG. 9), and these correspond to an SI-R. The method for determining the host on which the EPO is invoked is the same as that of an EPMO. However, it is possible to fix the EPO used for each event type. Here, the EPMO creates an event type factory (ETF) in the EP. A unified event type name space is guaranteed in the EP by the ETF.

Request for Establishing Session for Event Place to Send Event (FIG. 9(5), Step S5 of FIG. 26)

Next, the EP is requested to establish a session. The EPMO creates a proxy object (PO) for each session request. A session identifier, being an identifier of the PO, is returned to the source of the request.

Here, when creating a PO, the EPMO instructs the PO which EPO is used (which EPO to bind with). This instruction is necessary for multiple EPOs. However, a method for determining the EPO to bind with is the same as that of an EPMO. When the EP is requested to establish a session, it is necessary to specify whether the session is for event sending or the session is for event receiving. In the present example, a session for sending an event is specified.

Registration of Event Type (FIG. 9(6), Step S6 of FIG. 26)

Next, the PO is requested to register an event type. At this time, the PO requests the ETF to create an event type object (ETO). Furthermore, it stores the event type in the ETO. On the other hand, it is possible to request the EP to register the event type. At this time, the EPMO requests the ETF to create an ETO, and stores the event type in the created ETO. In general, in the case where an event sender registers an event type, it is performed via a PO. On the other hand, an EP administrator registers an event type in the EP. Here, if an event type with the same name is registered, it creates an error.

Request for Establishing Session for Event Place to Receive Event (FIG. 9(7), Step S7 of FIG. 26)

Next, the EP is requested to establish a session for receiving an event. At this time, a session establishment requester (event receive object) provides an identifier of an event receive object, being the destination of event notification, and a method for notifying an event (ignition type, look in type) as parameters. Furthermore, that it is event receive may be included as a parameter.

Subsequently, the EPMO creates a PO for each session request. It returns a session identifier (identifier of PO) to the source of the request. Here, when creating a PO, the EPMO specifies the EPO to be used for the PO. This specification is necessary for multiple EPOs. However, the method for determining an EPO to bind with is the same as that of an EPMO.

Request to Create Filter Object (FIG. 9(8), Step S8 of FIG. 26)

Next, the PO is requested to create a filter object (FO). At this time, the PO requests an FF to create the FO. At this time, an FF accompanying the EPO bound with the PO is used. Here, the identifier of the created FO is returned to the source of the request to create the FO via the PO.

Setting of Filter Value (FIG. 9(9), Step S9 of FIG. 26)

Next, the PO is requested to define a filter value for the FO using the FO identifier as a parameter. Here, it is possible to selectively request the ETO to check whether the data structure (filter value) of the FO is correct by using the event type name (that is, event type name as an target of filtering) stored in the filter object as a key. If it is not correct, it creates an error. However, in the case where a wildcard is assigned, this check is not performed at all.

Filter Registration (FIG. 9(10), Step S10 of FIG. 26)

Next, after the filter value of the FO is defined, the PO is requested to register the filter using the identifier of the FO as a parameter. At this time, the filter identifier is returned to the source of the registration request. After this, it is possible to receive an event. Here, it is possible to register a plurality of filters via one PO (for this, a case can be considered where a plurality of different FOs are registered as a filter via one PO, or the same FO is registered as a filter a plurality of times). However, all filters registered for one PO have an "OR relationship".

Figure 27:
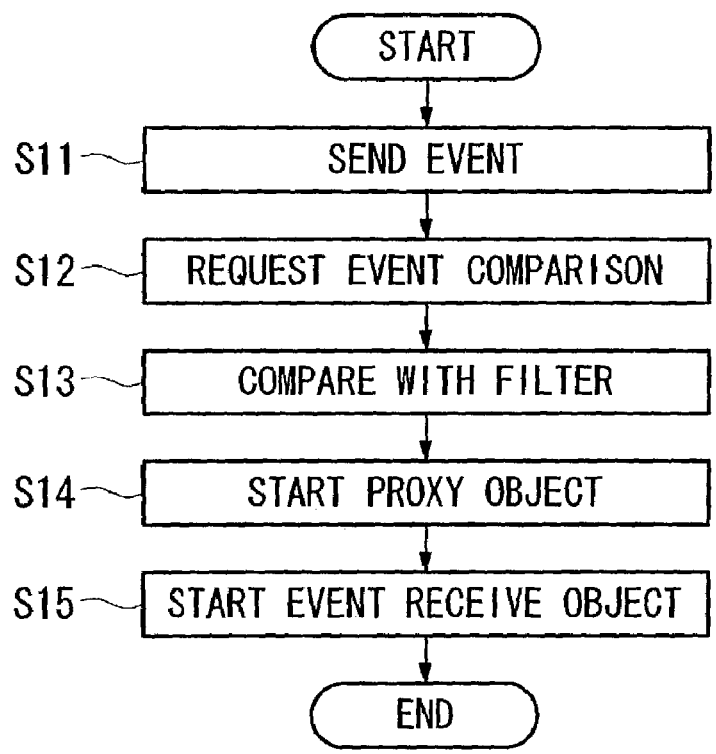
FIG. 27 is a flow chart showing a processing mechanism of an autonomous decentralized comparison environment (SION).

Event Sending (FIG. 9(A), Step S11 of FIG. 27)

Next, the event sender sends an event to the PO. At this time, it is possible for the PO to selectively request the ETO to check whether the data structure of the event is correct, using the event type name stored in the event as a key. If it is correct when this checking is selected, it proceeds to the next process (FIG. 9(B)), and if it is not correct, it creates an error.

Request for Event Comparison (FIG. 9(B), Step S12 of FIG. 27)

Next, the PO forwards the event to the EPO. At this time, the EPO creates a thread. Here, a thread is created for each event, and each thread performs multiple event processing.

Comparison with Filter (FIG. 9(C), Step S13 of FIG. 27)

Next, in the EPO, the thread performs a filtering process by comparing the event and the filter. This includes complete matching, partial matching, weighted matching and the like, which may be selected when setting the filter value.

Start of Proxy Object (FIG. 9(D), Step S14 of FIG. 27)

Next, when the event passes through the filter as a result of comparison with the filter, the corresponding PO is activated, and receives this event. At this time, it is selectively possible for the PO to register the type, the value, the ID and the like of received event in the SO. This information enables the SO to measure the ignition rate (for each event type, for each event) of the event, and popular events in the EP.

Ignition Type Event Notification (Start of Event Receive Object) (FIG. 9(E), Step S15 of FIG. 27)

Next, the PO starts an event receive object, and also passes this event to the event receive object. This corresponds to ignition type (interrupt type) event notification.

Look In Type Event Notification (FIG. 9(F))

On the other hand, it is also possible that the PO does not start the event receive object, but the event receive object itself extracts the event spooled in the PO corresponding to the event receive object. This corresponds to look in type event notification. There is a range of opportunities for the event receive object to start depending on the type of service. However, as a typical example, a case can be considered wherein an end user requests an event receive object to recommend content.

<Method for Managing Filters>

Next is a description of a method for managing filters in each EPO.

Firstly, a session is established for receiving events. At this time, one PO is created for each session request, and this PO is bound to an arbitrary EPO. One FF accompanies each EPO. In this manner, the EPO that a PO uses is uniquely determined, and the following processes are all performed via a PO (session for receiving events).

Next, an FO is created, and a filter value (type of receive event, and its acquisition conditions) is set for the FO. Subsequently, a filter is registered using an FO identifier as a parameter. At this time, an FO identifier is stored in each filter. Each EPO manages filters registered via a PO based on the following rules.

Firstly, "receive event types" set in the FO are referenced using FO identifiers stored in filters. Subsequently, filters are categorized for each type of receive event, and the categorized filters for each event type are further sub-categorized for each PO for management.

Figure 11:
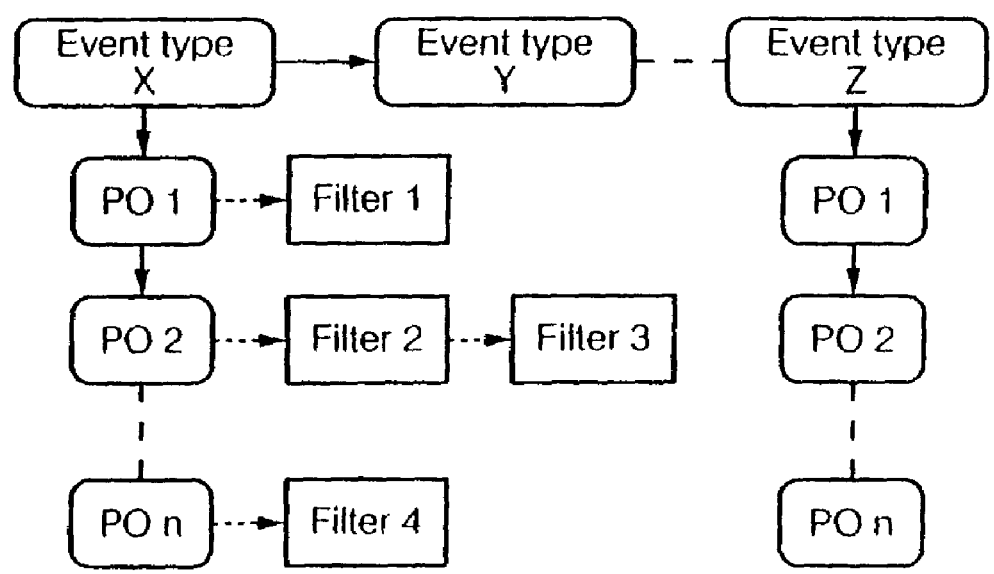
FIG. 11 is an explanatory diagram showing a filter management method.

Regarding this management rule, a case of registering a filter via a PO 1 will be described with reference to FIG. 11. Here, "an event type X" is set as a type of receive event in the FO assigned when registering a filter. At this time, a filter registered in the EPO corresponds to a filter 1 in FIG. 11, and similarly, a filter registered via a PO 2 corresponds to a filter 2. Furthermore, it is possible to register a plurality of filters in each PO. However, registered filters have an "OR relationship".

Firstly, when an event of the event type X reaches the EPO, it is compared with the filter 1. If the filter 1 is ignited as a result, the PO 1 is activated. Next, it is compared with the filter 2, and if the filter 2 is ignited as a result, the PO 2 is activated. At this time, since the filter 2 and the filter 3 have an "OR relationship", comparison with the filter 3 is not performed. By using such a method for managing filters, it is possible to basically reduce the number of comparison processes for one event in each EPO to less than the number of POs (number of receive sessions).

<Event Routing Method: Routing Method in Arbitrary Topology>

<Event Routing Method: Routing Method in Arbitrary Topology>

Next is a description of an event routing method.

An EPO (SI-SW) accommodates senders and receivers of events in a star configuration via sessions. Furthermore, EPOs (SI-SW) are comparison switches that compare filters registered by event receivers and events sent from event senders, and notify the events (events are delivered only to matching event receivers) only to event receivers corresponding to filters ignited as a result.

Accordingly, if the number of event senders (number of events) and event receivers(number of filters) increases, the EPO processing capability is consumed proportionally. Therefore, SION provides multiple EPOs as a device for realizing high scalability of EP. Having multiple EPOs aims to improve the total processing capability of EP in a way that is scalable. To be specific, high scalability of EP is achieved from the following two points.

A first point is load distribution and autonomous decentralized. This avoids the bottleneck factor associated with centralized processing, by delivering the load of filtering process of events by delivering event sender receivers around a plurality of EPOs. Furthermore, it achieves decentralized collaboration by mechanisms capable of operating autonomously, with each EPO having no influence from other EPOs.

A second point is optimization by reduction of network traffic and optimization of filtering process. This minimizes the amount of communication by not forwarding unnecessary events between EPOs, with an accompanying reduction of filtering process.

In FIG. 10, a case is considered where a filter of an event type X is registered as a type of receive event in EPO 3, 33. Here, when an event of the event type X is sent to EPO 4, it is necessary to forward this event to EPO 3 via EPO 2. At this time, the event must not be forwarded to EPO 1 where the filter of the event type X is not registered. A shared link object (SLO) performs such routing control of events between EPOs, which corresponds to the aforementioned SI-R.

As follows is a detailed description of an SI-R.

Figure 12:
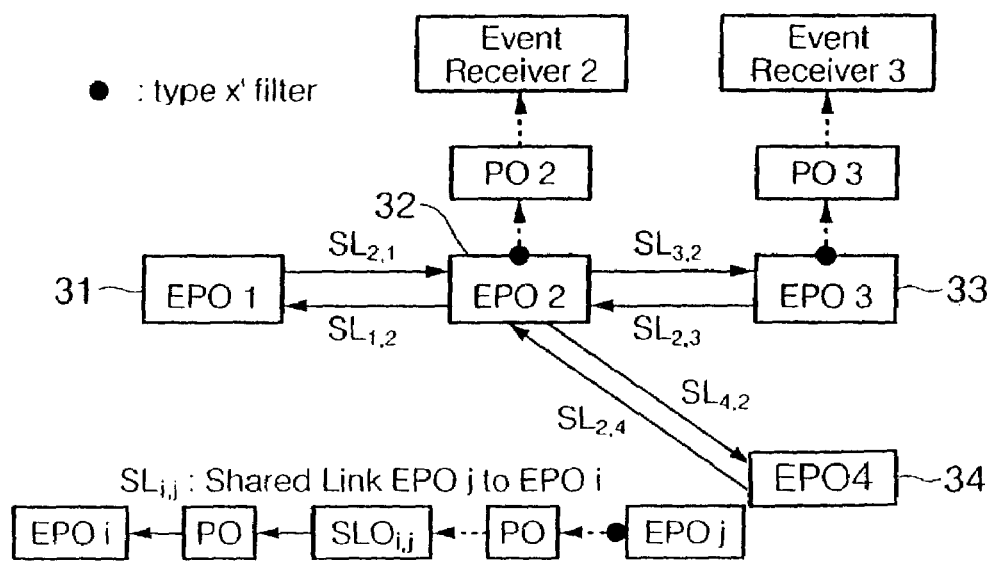
FIG. 12 is an explanatory diagram showing an event routing method.

Firstly, when initializing an EP, SLOs are created accompanying each EPO based on physical link information (topology of EPO). For example, in FIG. 9, three SLOs are created for the EPO 2. These correspond to an SLO2,1, an SLO2,3 and an SLO2,4 in the figure. This SLOi,j establishes a shared link (SLi,j) for forwarding events from EPO j to EPO i. That is, as shown in FIG. 9 and FIG. 12, the SLOi,j establishes an event receive session for the EPO j, and likewise establishes an event send session for the EPO i, thus establishing a shared link SLi,j, being a logical link for forwarding events (shared link means session establishment by SLO when initializing an EP, and does not include a filter registration process).

After initializing an EP, an event receiver establishes a session for an EP, which enables a filter to be registered via the session. At this time, an event path is created according to the shared link established. For example, in FIG. 12, in the case where an event receiver 3 registers a filter for receiving an event of "event type X" in the EPO 3 via PO 3, the PO 3 registers the filter of the event type X in the EPO 3, and also notifies it to SLO3,j (here SLO3,2). The SLO3,2 registers a filter of event type X in the EPO 2 using the SL3,2. This is performed via a PO for a receive session allocated to the SLO3,2 as mentioned above. Similarly, this PO notifies it to the SL02,j other than SLO2,3. SLO2,j (j 3) registers the filter in the EPO using SL2,j. Subsequently, the same is repeated until paths for the event X are established in all EPOs.

A series of paths established for an event type X in this manner is called an event path. In this regard, a request for establishing an event path for each event type is sequentially and autonomously distributed to all EPOs, triggered by a filter registration via a PO 3. That is, each EPO may recognize only an adjacent EPO. As a result, it is possible to establish event paths with a simple, unified, autonomous logic compared with a method for establishing and managing event paths by centralized management or broadcasting.

Figure 13:
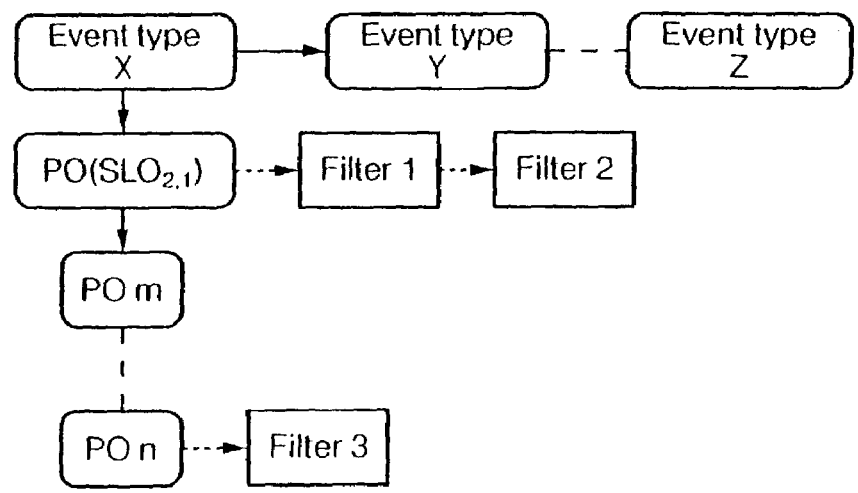
FIG. 13 is an explanatory diagram showing a filter registration condition.

FIG. 13 shows the filter registration conditions in the EPO 1 at this point of time. As a result of the event receiver 3 registering the filter via the PO 3, the filter 1 is registered in the EPO 1. Establishing an event path means registering filters for forwarding events to a series of EPOs based on shared link information. Furthermore, only receive event type names are set in the filters that an SLO registers, and acquisition conditions are not set, so filtering is only performed of event type name.

In this situation, when an event receiver 2 registers the filter of event type X in the EPO 2 via PO 2, the establishment of new event path extends to all EPOs. As a result, a filter 2 is registered in the EPO 1, and a filter is registered for each request to establish an event path.

At this time, when an event of event type X is sent to the EPO 1, the filter 1 is ignited, and the SLO2,1 is activated. By the SLO2,1 sending this event to the EPO 2, the SLO3,2 is activated. Furthermore, the event is also forwarded to the EPO 3 via the SLO3,2. Moreover, in order to prevent infinite event forwarding between SL2,3 and SL3,2, an event holds a maximum of two latest identifiers of EPOs that it has passed through in as control information.

Here, as mentioned above, since the filter 1 and filter 2 have an OR relationship, in the case where the filter 1 is ignited, comparison with the filter 2 is not performed. As a result, it is possible to completely avoid the occurrence of redundant filtering process overhead accompanying a new registration of the filter 2, regardless of the existence of the filter 1. This means that when an event path is established, there is no need to reconstruct all established event paths, which enables simple and unified event paths to be established autonomously.

Furthermore, in the case (corresponding to a filter 3 of PO n) where there is a session established by an event receiver and through which filters have been registered in the EPO 1, after filtering process corresponding to an SLO is all completed, filtering process of the session (corresponding to PO n) established by the event receiver to the EPO is performed. That is, processing of event forwarding to other EPOs takes priority, and afterwards, comparison processing is started in this EPO.

For a further effect of the event routing method described above, a point is noted that when canceling filter registration, reconstruction of event paths is not required. For example, in the case where the event receiver 3 cancels the registration of a filter registered via the PO 3, similarly to the case of registration, a cancellation request is distributed sequentially and autonomously. As a result, only registration of the filter 1 is cancelled in the EPO 1. However, the filter 2 exists (after this, the filter 2 forwards an event instead of the filter 1), so that the consistency of all existing event paths is guaranteed without reconstructing the event paths.

By using such an autonomous, decentralized type routing control method, it is possible to realize the interconnection and decentralized collaboration of EPOs easily. Along with this, it is possible to perform switching from a small sized network to a large sized network, from a local network to a global network, and the like, smoothly. Furthermore, it is possible to achieve a global network by a bottom up approach easily, using common logic.

<Routing Method in Ring Type Topology: Method Using Event Paths>

Figure 28:
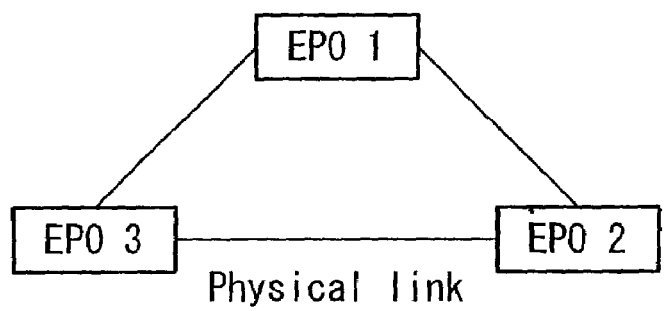
FIG. 28 is an explanatory diagram showing a physical link.

In FIG. 28, a case is considered where a filter of the event type X is registered as a type of receive event in EPO 3. Here, when an event of the event type X is sent to EPO 1, it is necessary to forward this event from EPO 1 to EPO 3, or via EPO 2. A shared link object (SLO) performs such routing control of events between EPOs, which corresponds to the aforementioned SI-R.

As follows is a detailed description of an SI-R.

Firstly, when initializing an EP, SLOs are created accompanying each EPO based on physical link information (topology of EPO). For example, in FIG. 9, an SLO2,3 is created for the EPO 2. This SLOi,j establishes a shared link (SLi,j) for forwarding events from EPO j to EPO i. That is, as shown in FIG. 9 and FIG. 29A, the SLOi, j establishes an event receive session for the EPO j, and likewise establishes an event send session for the EPO i, thus establishing a shared link SLi,j, being a logical link for forwarding events (shared link means session establishment by SLO when initializing an EP, and does not include a filter registration process). In this manner, a ring shaped, unidirectional shared link is established.

After initializing an EP, an event receiver establishes a session for an EP, which enables a filter to be established via the session. At this time, an event path is created accompanying the shared link established. For example, in FIG. 29A, a case is considered where an event receiver 3 registers a filter for receiving an event of event type X in the EPO 3 via PO 3. At this time, the PO 3 registers the filter of the event type X in the EPO 3, and also notifies it to SLO3,j (here SLO3,2). At this time, the fact that the source of the request to create a filter registration is EPO 3 is given to the SLO3,1 as a parameter. The SLO3,1 registers a filter of event type X in the EPO 1 using the SL3,1. This is performed via a PO for a receive session allocated to the SLO3,1 as mentioned above. Similarly, this PO notifies it to the SLO1,2. SLO1,2 registers the filter in the EPO using SL1, 2. Subsequently, the same is repeated until paths for the event X are established in all EPOs. Here, this process is repeated immediately before the source of the request to register a filter (here, EPO 3). That is, the SLO2,3 does not register a filter in the EPO 3.

A series of paths established for an event type X in this manner is called an event path. This is a system in which an event path establishment request for each event type is sequentially and autonomously distributed to all EPOs, triggered by a filter registration via a PO 3. That is, each EPO may recognize only an adjacent EPO. As a result, it is possible to establish event paths with a simple, unified, autonomous logic compared with a method for establishing and managing event paths by centralized management and broadcasting of event paths.

Figure 29B:
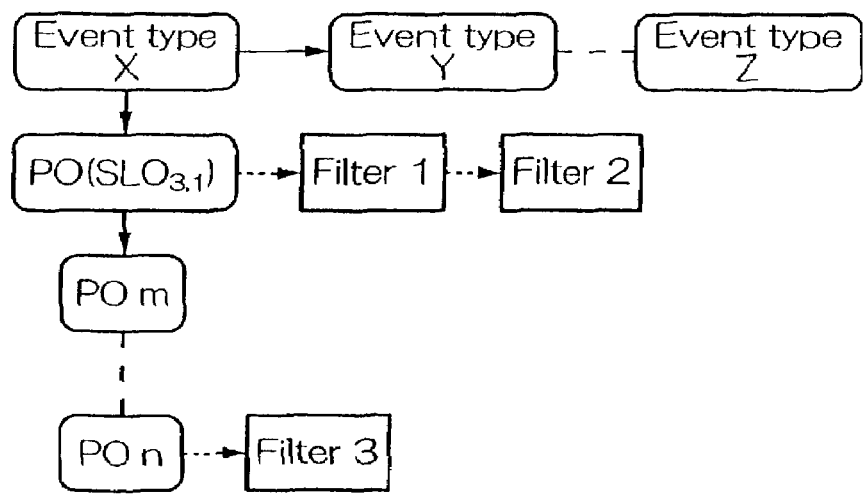

FIG. 29B shows the filter registration conditions in the EPO 1 at this point of time. As a result of the event receiver 3 registering the filter via the PO 3, the filter 1 is registered in the EPO 1. Establishing an event path means registering filters for forwarding events to a series of EPOs based on shared link information. Here, only receive event type names are set in the filters that an SLO registers, and acquisition conditions are not set, so filtering is only performed of event type name.

In this situation, when an event receiver 2 registers the filter of event type X in the EPO 2 via PO 2, the establishment of new event paths extends to all EPOs. As a result, a filter 2 is registered in the EPO 1, and a filter is registered for each request to establish an event path.

At this time, when an event of event type X is sent to the EPO 1, the filter 1 is ignited, and the SLO3,1 is activated. By the SLO3,1 sending this event to the EPO 3, the SLO2,3 is activated. Furthermore, the event is also forwarded to the EPO 2 via the SLO2,3. Here, in order to prevent infinite event looping, an event holds the identifier of the EPO where the event was created as control information, and if the event is circulated and returned to the EPO (SLO) that was the source of the event creation, the event is cancelled.

Here, as mentioned above, since the filter 1 and filter 2 have an OR relationship, in the case where the filter 1 is ignited, comparison with the filter 2 is not performed. As a result, it is possible to completely avoid the occurrence of redundant filtering process overhead accompanying a fresh registration of the filter 2, regardless of the existence of the filter 2. This means that when an event path is established, there is no need to reconstruct all event paths where there are existing event paths, which enables simple and unified event paths to be established autonomously.

Furthermore, in the case (corresponding to a filter 3 of PO n) where there is a session established by an event receiver, and through which filters have been registered in the EPO 1, after filtering process corresponding to a SLO is all completed, filtering process corresponding to PO n is performed. That is, processing of event forwarding to other EPOs takes priority, and afterwards, comparison processing is started in this EPO.

For a further effect of the event routing method described above, a point is noted that when canceling filter registration, reconstruction of event paths is not required. For example, in the case where the event receiver 3 cancels the registration of a filter registered via the PO 3, similarly to the case of registration, a cancellation request is distributed sequentially and autonomously. As a result, only registration of the filter 1 is cancelled in the EPO 1. However, the filter 2 exists (after this, the filter 2 forwards an event instead of the filter 1), so that the consistency of all existing event paths is guaranteed without reconstructing the event paths.

By using such an autonomous, decentralized type routing control method, it is possible to realize interconnection and distributed collaboration of EPOs easily. Along with this, it is possible to perform switching from a small sized network to a large sized network, from a local network to a global network, and the like, smoothly. Furthermore, it is possible to achieve a global network by a bottom up approach easily, using common logic.

<Routing Method in Ring Shaped Topology: Method Using Wildcards>

Next is a description of an event routing method different from the event routing method of a ring shaped topology using event paths described previously. In this routing method, the procedure up to the establishment of a shared link (logical link) is similar to the method mentioned previously. A different point from the method mentioned previously is that this routing method does not establish event paths, but registers only one filter at the same time as an SLOi,j establishes a shared link SLi,j. At this time, a wildcard is assigned to a filter to be registered as a type of a receive event. As a result, all events become objects for forwarding, and an event path is not established for each event type.

In this manner, by assigning a wildcard in semantic information, an event circulates following a ring shaped shared link SLi,j, so that it is possible to deliver the event to all EPOs.

<Routing Method Using Sequential Numbers>

In addition to the method using event paths or the two methods using ring topology described above, a different routing method (method using sequential numbers) is further shown.

FIG. 30 is a conceptual diagram showing a procedure of an event routing method.

In the figure, a numeral 211 denotes an event sender, and numerals 212 and 213 denote event receivers. The numerals 214 and 215 are EPOs where the event routing method is achieved. Here, SLOs, which exist between EPOs, are not specifically mentioned in the following description of the event routing. Furthermore, in FIGS. 30 and 32, "supplier" in the figures corresponds to "event sender", and "consumer" corresponds to "event receiver". Moreover, "NS" (event notification service) corresponds to "EPO".

FIG. 30 shows a procedure of event notification for notifying event information between an event sender 211 and event receivers 212 and 213 via EPOs 214 and 215.

In FIG. 30, firstly the event sender 211 sends an event to the directly connected EPO 214 (1. deliver event). On receiving the event, the EPO 214 performs processing to assign an event identifier (ID) to the event as additional information that can identify the event uniquely in a network wide environment (2. assign event ID), store the event ID in an event ID list 221 (3. store event ID), deliver the event whose ID, being additional information, is removed to a group of directly connected event receivers (here only the event receiver 212), and forward the event containing the additional information to a group of directly connected EPOs (here, only the EPO 215) downstream (4. deliver event).

On receiving the forwarded event, each EPO (EPO 215 in the figure) checks whether the same event ID is stored in the event ID list (here, event ID list 221) or not (5. check event ID). An EPO in which the same event ID is found by this check discards the event, and an EPO in which none is found performs processing to store the event ID in the event ID list 221 (6. store event ID), and deliver the event whose event ID, being additional information, is removed, to only a group of directly connected event receivers (here, only the event receiver 213) (7. deliver event), and forwards the event containing the additional information to a group of directly connected EPOs downstream (here, none exist).

Accordingly, by locating the EPOs 214 and 215 in a plurality of network nodes, connecting them, and establishing a plurality of event forwarding routes, it is possible to distribute the event delivery processing load, and also it is possible to reduce the frequency of event loss by obstructions or the like when forwarding an event between network nodes. Furthermore, it is not necessary for the event receivers 212 and 213 to check the same event from the plurality of event forwarding routes, so that it is possible to achieve the group of EPOs 214 and 215 that deliver a non duplicated event to the event receivers 212 and 213. This group of EPOs 214 and 215 is seen as one EPO from the event sender 211 or the event receivers 212 and 213.

FIG. 31 is a block diagram showing the internal structure of a highly reliable event delivery apparatus that performs an event routing method using sequential numbers. As described above, in a highly reliable event delivery apparatus of the present invention, an event sender delivers an event to an unspecified number of event receivers via EPOs, the EPOs are located at a plurality of network nodes and connected to each other, and a plurality of paths are set up for delivering the event in order to perform highly reliable event delivery.

To achieve the above, a highly reliable event delivery apparatus of the present invention comprises an event ID storage section 421, an event ID assignment section 422, an event ID comparison section 423, an event ID updating section 424, and an event delivery control section 425.

In the event ID storage section 421, an event ID list is stored as mentioned above. The event ID assignment section 422, which is in each of the EPOs 214 and 215, assigns each event an identifier that can identify it uniquely under a network environment. The event ID comparison section 423 compares it with event IDs that were delivered and stored in the past in order to detect whether a duplicate event was delivered from a different path, and supplies a result to the event ID updating section 424. Here, in the case where the same event ID exists, the event is removed, and in the case where the same ID does not exist, the event ID is newly stored in the event ID storage section 421.

The event delivery control section 425 delivers an event whose event ID is removed to a group of EPOs connected directly to the event sender (supplier) 211 of an unspecified number of event receivers (consumers) 212 and 213, and delivers an event with an ID assigned to a group of EPOs located downstream of the directly connected EPO.

FIG. 32 is an embodiment showing a procedure for achieving this event routing method expanded onto a network tree.

In FIG. 32, when an EPO 231 receives an event from an event sender 221, it assigns an event ID that can identify the event uniquely under a network wide environment as additional information, stores the event ID in an event ID list managed by the EPO 231, delivers an event whose event ID, being additional information, is removed to a directly connected event receiver (here, an event receiver 222), and forwards an event with the additional information to a group of directly connected EPOs (here, EPOs 232 and EPO 233) downstream.

Next, on receiving the forwarded event from the EPO 231, the EPO 232 and the EPO 233 check whether a similar event ID to the event ID of this event is stored in the event ID lists that they manage. In this case, since the same event ID is not found by this check, the EPO 232 and the EPO 233 store the event ID in the event ID lists that they manage, deliver the event whose event ID, being additional information, is removed to a directly connected event receiver, and forward the event with additional information to directly connected EPOs downstream, (here, an EPO 234 is an EPO downstream, connected directly to the EPO 232 and the EPO 233).

Subsequently, the EPO 234 receives the same forwarded event from both the EPO 232 and the EPO 233. If the EPO 232 receives the event first, the EPO 234 checks whether a similar event ID to the event ID of this event is stored in the event ID list that the EPO 234 manages.

Here, since the same event ID is not found by this check, the event ID is stored in the event ID list, the event whose event ID, being additional information, is removed is delivered to a directly connected event receiver, and the event with the additional information is forwarded to a directly connected EPO 235 downstream.

On the other hand, the same event as mentioned above is also forwarded from the EPO 233. At this time, the EPO 234 checks whether a similar event ID to the event ID of this event is stored in the event ID list that the EPO 234 manages.

At this check, the same event ID is found in the event ID list, so the EPO 234 discards the event. In this case, event forwarding to a directly connected event receiver and a directly connected EPO downstream is not performed, and hence a duplicate event is not delivered.

The EPO 235 receives the forwarded event from EPO 234 only once, and at this time the EPO 235 checks whether a similar event ID to the event ID of this event is stored in the event ID list that the EPO 235 manages.

Here, since the same event ID is not found by this check, the event ID list is stored in the event ID list, and the event whose event ID, being additional information, is removed is delivered to a directly connected event receiver. Here, since there is no EPO downstream connected directly to the EPO 235, event delivery is completed.

Even if there is an obstruction to event forwarding from the EPO 232 to the EPO 234 during this operation, preventing the forwarding, since the event to be forwarded from the EPO 233 to the EPO 234 is not in the event ID list of the EPO 234, it is not removed, and the event is delivered to an event receiver and a directly connected EPO downstream.

Here, in the embodiment shown in FIG. 32, regarding the forwarding route from the EPO 231 to the EPO 232, the forwarding route from the EPO 234 to the EPO 235, and the like, since there is only one route, it is possible to use a method of building forwarding routes from the EPO 233 to the EPO 232, building forwarding routes from the EPO 233 to the EPO 235, and the like.

<Federation Method>

Figure 14:
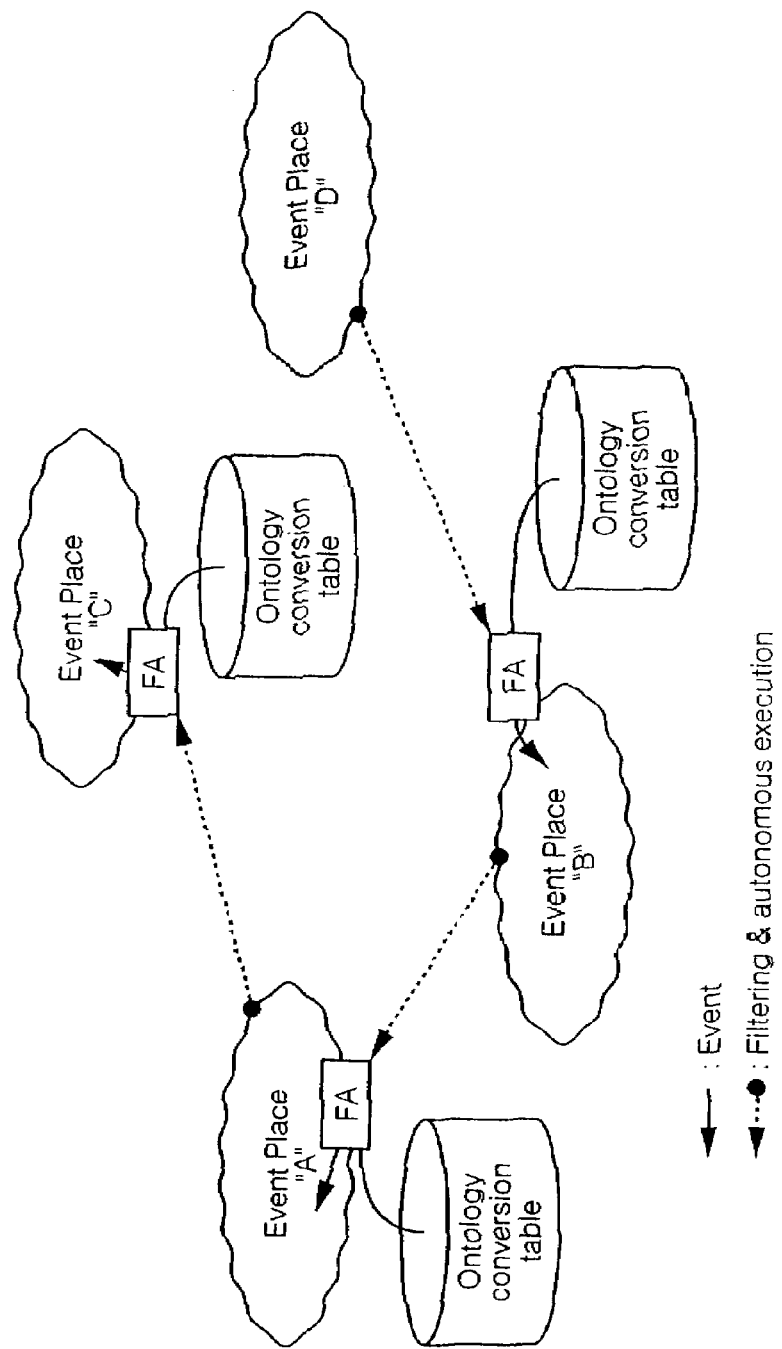
FIG. 14 is an explanatory diagram showing a federation method.

Next is a description of a federation method with reference to FIG. 14. A federation agent (FA) means an agent for establishing a federation between event places, and corresponds to an SI-GW mentioned previously. For example, a case is considered where an event place A establishes a federation with an event place B. Firstly, an FA belonging to the event place A registers a filter in the event place B. At this time, an event sender belonging to the event place B sends an event, and if this filter is ignited as a result, the FA starts autonomously. This means that the FA can be regarded as an event receiver belonging to the event place B. Next, the FA resends the event obtained to the event place A that it belongs to. This enables the FA to be regarded as an event sender belonging to the event place A.

By using an FA having both roles in this manner, it is possible to easily achieve a federation between event places. That is, it is possible to achieve a federation between event places using the same control logic as a single event place. By interconnecting event places, being basic structural units of SION 1, it is possible to build a global comparison network by a bottom up approach, thus enabling the achievement of event sharing among event places. Here, in the case where the event place A and the event place B have different ontology systems, after converting an event obtained from the event place B into the ontology of the event place A, an FA belonging to the event place A sends it to the event place A.

Ontology conversion is required in the case where forwarding an event extends to a different ontology system. For conventional methods to perform this conversion, there are methods such as a method in which a standard ontology is defined and event forwarding is performed after conversion into a form based on the standard ontology for a time when forwarding an event to another event place, a method in which ontology conversion tables are prepared in advance for a number of combinations of event places, and the like.

However, in order to deal with a dynamic federation (dynamic start and cancellation of federation) of event places, the conventional methods lack flexibility. Therefore, in the present invention, as shown in FIG. 14, an FA holds only the difference (conversion information) from the ontology information of an adjacent event place in an ontology conversion table. That is, this is a method in which each FA distributes and holds conversion information, and the integrity of the ontology system is guaranteed. This makes it possible to deal with dynamic federations between event places easily. However, conversely, since ontology conversion processing occurs each time an event passes an event place, there is a characteristic that the conversion processing overhead is increased compared with the conventional methods.

<Ontology Conversion Method>

Regarding the three ontology conversion methods described above, a comparison of the methods will be shown with a more detailed description.

1. Ontology Conversion Method 1 (Using Standard Ontology)

This method defines a standard ontology (global, common system), and uses it for a federation between event places. FIG. 33 shows a system of the present method. Firstly, this figure shows that an event place 501 is connected to an event place 502, and the event place 502 to an event place 503 by an FA 1 and an FA 2 respectively, and an event 1 sent from the event place 501 is forwarded to the event place 502 by the FA 1, and further to the event place 503 by the FA 2. Furthermore, the numerals inside the brackets of events in the figure indicate on which event place ontologies the descriptions of those events are based.

The processing of the present method will be described using FIG. 33.

(1) Firstly, an event 1 is sent to the event place 501. The event 1 sent is described based on the ontology of the event place 501 at this time.

(2) The FA 1 is activated autonomously by the above-described event 1, and receives the event 1 concerned. Then, the FA 1 performs ontology conversion on the event 1 into an event 2, which is based on a standard ontology.

(3) The FA 1 forwards the above-described event 2 to the FA 2. At this time, it delivers the event 2 directly to the FA 2 by tunneling through the event place 502. Furthermore, after performing ontology conversion on the event 2 concerned into an event 3, which is based on the ontology of the event place 502, the FA 1 sends the event 3 concerned to the event place 502.

(4) On receiving the event 2 as described above in (3), the FA 2 performs ontology conversion on the event 2 into an event 4, which is based on the ontology of the event place 503. Then, the FA 2 sends the event 4 concerned to the event place 503.

That is, in the present method, when forwarding events between event places, an event is converted to one based on the standard ontology for a time, then afterwards it is converted into one based on the ontology of the event place of the event receiver.

2. Ontology Conversion Method 2 (Ontology Conversion is Performed Between a Sender Event Place and a Receiver Event Place)

This method is to convert from an event based on the ontology of the event place of an event sender into an event based on the ontology of the event place of a receiver. The present method will be described using FIG. 34. Similarly to FIG. 33, FIG. 34 shows that an event place 501 is connected to an event place 502, and the event place 502 to an event place 503 by an FA 1 and an FA 2 respectively, and an event 1 sent from the event place 501 is forwarded to the event place 502 by the FA 1, and further to the event place 503 by the FA 2. Furthermore, the numerals inside the brackets of events in the figure indicate on which event place ontologies the descriptions of those events are based.

The processing of the present method will be described using FIG. 34.

(1) Firstly, the event 1 is sent to the event place 501. The event 1 sent is described based on the ontology of the event place 501 at this time.

(2) The FA 1 is activated autonomously by the above-described event 1, and receives the event 1 concerned. The FA 1 forwards the event 1 concerned to the FA 2. At this time, it delivers the event 1 directly to the FA 2 by tunneling through the event place 502. Furthermore, after performing ontology conversion on the event 1 concerned into an event 2, which is based on the ontology of the event place 502, the FA 1 sends the event 2 concerned to the event place 502.

(3) On receiving the event 1 as described above in (2), the FA 2 performs ontology conversion on the event 1 into an event 3, which is based on the ontology of the event place 503. Then, the FA 2 sends the event 3 concerned to the event place 503.

3. Ontology Conversion Method 3 (Ontology Conversion is Performed Between Adjacent Event Places)

The present method always converts an event into the ontology of an adjacent event place. The present method will be described using FIG. 35. Similarly to FIG. 33 and FIG. 34, FIG. 35 shows that an event place 501 is connected to an event place 502, and the event place 502 to an event place 503 by an FA 1 and an FA 2 respectively, and an event 1 sent from the event place 501 is forwarded to the event place 502 by the FA 1, and further to the event place 503 by the FA 2. Furthermore, the numerals inside the brackets of events in the figure indicate on which event place ontologies the descriptions of those events are based.

The processing of the present method will be described using FIG. 35.

(1) Firstly, the event 1 is sent to the event place 501. The event 1 sent is described based on the ontology of the event place 501 at this time.

(2) The FA 1 is activated autonomously by the above-described event 1, and receives the event 1 concerned. Then, after performing ontology conversion on the event 1 concerned into an event 2, which is based on the ontology of the event place 502, the FA 1 sends the event 2 concerned to the event place 502.

(3) The FA 2 is activated autonomously by the above-described event 2, and receives the event 2 concerned. Then, the FA 2 performs ontology conversion on the event 2 into an event 3, which is based on the ontology of the event place 503. Then, the FA 2 sends the event 3 concerned to the event place 503.

FIG. 36 shows a comparison of the three ontology conversion methods described above by three comparative items. The three ontology conversion methods above are placed vertically down the left-hand column, and the three comparative items are described horizontally across the top row.

The first comparative item, "(A) number of pieces of ontology conversion information held by each FA", indicates the number of pieces of ontology conversion information that one FA must hold for ontology conversion. Here, ontology conversion information (ontology conversion table) means the information used to convert an event described based on one ontology into an event described based on another ontology. The ontology conversion methods 1 and 3 require at most two and one pieces of ontology conversion information respectively. However, the ontology conversion method 2 requires the largest number (the number of event places—1) of pieces of ontology conversion information.

The next comparative item, "(B) number of ontology conversions performed for a specific event by each FA" is the number of ontology conversion processes performed for only one event received by each FA. For the ontology conversion methods 1, 2 and 3, it is at most two, one and one respectively. That is, regarding the present comparative item, the relative superiority or inferiority between the ontology conversion methods is negligible.

The last comparative item, "(C) number of ontology conversions performed for the event concerned when the event is forwarded across a plurality of event places" is the number of ontology conversion processes performed for the event concerned when the event is forwarded across a plurality of event places, in the case where a specific event is paid attention. The largest number (the number of FA passed—1) of ontology conversion processes is performed in the ontology conversion method 3, while the ontology conversion methods 1 and 2 have at most two and one.

The characteristics of the ontology conversion methods 1, 2 and 3 will be described in order using the above comparative items (A), (B) and (C).

The ontology conversion method 1 has no problem with comparative items (A), (B) and (C), and it has the best processing efficiency. However, the present method has a problem that it must establish a standard ontology. In IP, it has been possible to establish an address system as a unique standard all over the world. However, an address system in a semantic information-oriented network is, in other words, a semantic information system (ontology), so it is considered to be impossible to establish a unique standard system for such semantic information all over the world. For a facilitator or the like for example, a method is used wherein a standard ontology is used as a communication language between agents. However, practically, it is considered to be difficult to create such a standard ontology in a global environment. Therefore in the case where a global environment is targeted as an application region, the ontology conversion method 1 cannot be used.

Regarding the ontology conversion method 2, items (B) and (C) have no problem. However, there is a problem in item (A). That is, in the ontology conversion method 2, if the number of event places that perform federation increases, the number of pieces of ontology conversion information that each FA must hold increases proportionally. Therefore in the case where there is an enormous number of event places that perform federation (in the case where a global environment is targeted as an application region), it is, on balance, difficult to use the present method 2.

The ontology conversion method 3 is the method designed in the present invention. The present method 3 has no problem with items (A) and (B). However, there is a problem in item (C). That is, when the number of event places (FA) through which an event passes increases, the number of ontology conversions performed to this event increases proportionally. Therefore, there is a problem that not only is the ontology conversion processing efficiency poor, but also errors occurring during ontology conversion accumulate. However, since it focuses only on an adjacent event place, there is an advantage that active federation (active start and cancellation of federation) can be achieved easily.

To complete the above, in the case where a global, application region where an enormous number of event places exists is targeted, it is difficult to use the ontology conversion methods 1 and 2. Although there are some problems, only the ontology conversion method 3, being the method designed in the present invention, can deal with application in a global environment.

<Automatic Method of Ontology Conversion Information Creation>

As follows is a description of a method for creating ontology conversion information automatically. Heretofore, ontology conversion information has been created manually. However, a characteristic of the present invention is that it is created automatically. By creating it automatically, it is possible to reduce the effort of performing the creation operation manually. Here, the present automatic creation method can be applied to any of the above-described ontology conversion methods 1 through 3.

As follows is a step by step description of a method of automatically creating ontology conversion information by an FA.

(1) Acquire Semantic Information System

An FA acquires a semantic information system (ontology) from both an ontology conversion source event place and a conversion destination event place. Here, semantic information system specifically means the collection of event types registered in each event place. An FA can acquire a collection of event types registered in an event place by request to an EPMO.

Here, FIG. 37 shows a form of an event type, being an object of the present automatic creation method. The event type is described in a frame structure as shown in the present figure. That is, each event type comprises an event type name that specifies the event type uniquely, a parent type name that specifies an inherited parent type, an explanation (comment) where the role and the like of the event type concerned are described, and a plurality of slots comprising pairs of attribute names and attribute value type names. Here, it is not necessary to complete the comment. However, it is recommended to complete it in order to improve the accuracy of ontology conversion.

(2) Automatic Creation of Ontology Conversion Information

Ontology conversion information (ontology conversion table) is created based on the semantic information system acquired in (1) above.

The present automatic creation method is intended for the case where an event type is described based on a frame table as shown in FIG. 37 in both an ontology conversion source event place and a conversion destination event place. In this case, for event ontology conversion, it is necessary to obtain the correspondences of event types and slots, that is which event type in the conversion source event place corresponds to which event type in the conversion destination event place, and further which slot corresponds to which slot in the corresponding event types (refer to FIG. 38). That is, in the present automatic creation method, ontology conversion information is defined as a correspondence table (table) between event types and slots in a conversion source event place and a conversion destination event place.

Hereunder is a description of a method for creating such a correspondence table (ontology conversion information) divided into four substeps (2.1) through (2.4). These substeps comprise a similarity calculation method and a mapping method. The former is a method for calculating similarities between event types and between slots, and the latter is a method for determining the relationships between event types and slots. Here, for similarity, actual values 0 (dissimilar) through 1 (similar) are used.

(2.1) Calculate Similarity Between Slots

Similarity between slots is calculated by the similarity of corresponding attribute names and attribute value type names. Here, it is calculated by the minimum value of "similarity of attribute names" and "similarity of attribute value type names". That is similarity of slots=min("similarity of attribute names", "similarity of attribute value type names") (1).

Firstly, "similarity of attribute names" can be calculated using a thesaurus. At present, it is possible to obtain a plurality of thesauruses (for example, Goi-Taikei—A Japanese Lexicon (NTT Communication Science Laboratories, Iwanami Publishing), Kadokawa New Thesaurus (Kadokawa Publishing), a Japanese Thesaurus "Bunrui-Goihyo" (The National Institute for Japanese Language), EDR Electronic Dictionary (Japan Electronic Dictionary Research Institute) and the like), and an automatic corpus-based thesaurus construction method is being researched.

Here, "similarity of attribute names" is calculated using a method described in Natural Language Processing (written by Makoto Nagao). That is, in the case where a classification thesaurus is used (refer to FIG. 39), "similarity of attribute names" is calculated by the following equation where $d_c$ is the depth of an upper node common to two terms.

Similarity of Attribute Names=$d_c$/max(depth) (2)

Here, max(depth) is the maximum hierarchy depth of a thesaurus tree. On the other hand, in the case where upper and lower thesauruses are used, the similarity is obtained by the following equation.

Similarity of Attribute Names=$(d_c \times 2)/(d_i+d_j)$ (3)

Here,

| | | |
|---|---|---|
| $d_i$, $d_j$ | ... | depth of each term |
| $d_c$ | ... | depth of common upper node |

Here, when calculating the similarity of words such as attribute names, processing is performed after standardizing the coding (character code, upper case letters, lower case letters, full size, half size and the like). Furthermore, in order to deal with variations in parts of the writing (for example, foreign words, declensional kana endings, abbreviations and the like), the similarity of words is calculated by summing weightings of similarities calculated by approximate string match(best-match retrieval) or Levenshtein distance depending on the type of thesaurus used.

Next, regarding "similarity of attribute value type names", basically the same calculation method is used as for attribute names. That is, a tree is created with attribute value type names (string, integer, float and the like) as shown in FIG. 40 as elements, and the "similarity of attribute value type names" is calculated by the equations (equation (2) and equation (3)) for the similarity of attribute names described above.

(2.2) Determine Slot Correspondence (Mapping)

Slot mapping means a method for obtaining the most suitable correspondence between slots. In the present invention, mapping is achieved by the following simple algorithm.

[1] Create a similarity matrix of slot pairs. Here, the elements of the similarity matrix are the similarities of an $i^{th}$ slot of the conversion source event place and a $j^{th}$ slot of the conversion destination event place, calculated by equation (1) mentioned previously.

[2] The following is repeated until a pair of matching slots cannot be made (refer to FIG. 41).

[2.1] Obtain i and j where an element $A_{ij}$ of the similarity matrix is a maximum value max($A_{ij}$).

```
if (max(A_ij ) > á (constant that becomes a threshold)) {
    store slot pair (i, j)
} else {
    complete loop.
}
```

[2.2] Delete the row i and column j of the above-described similarity matrix.

A plurality of slot pairs indicating the correspondence between slots is calculated. Here, the constant á is for preventing incorrect slot pairs from being created.

(2.3) Calculate Similarity Between Event Types

Similarity of event types is calculated based on event type name, description, and the similarity of slots belonging to the event type concerned. That is, similarity of event type=min("similarity of event type names", "similarity of description", and "similarity of slot pair collection"). (4)

Firstly, the "similarity of event type names" is calculated by the same method as the similarity of attribute names mentioned previously. That is, it is calculated by equations (equation (2) and equation (3)) using a thesaurus.

Next, regarding "similarity of description", a vector-space model is used. That is, if the index term vectors of the description of the conversion source event type and the conversion destination event type are s and d respectively, then a "similarity of description" is calculated by the following vector inner product.

Similarity of description=$(s \cdot d)/(\|s\|\|d\|)$ (5)

Lastly, the "similarity of slot pair collection" is calculated by the following equation using the slot pair collection calculated by the slot mapping method described in (2.2).

Similarity of slot pair collection=(Ósimilarity of slot pair)/number of slots (6)

This expression is based on a concept that corresponding event types have similar slots.

(2.4) Decide Event Type Correspondence (Mapping).

Mapping of event types is the same as the method for slots. That is, a similarity matrix of event type pairs is created using equation (4), and correspondence (collection of event type pairs) is calculated by the mapping algorithm described in the substep (2.2).

<Community and Evolutionary Network>

Next is a description of a community service, one of the killer applications of a SION. An entity in a community service is an autonomous decentralized type activity capable of determining its activity style by repetitive learning, evolution, degradation, extinction and the like based on its own policy. A community provides a place for effective communication to such an entity. That is, an entity in the community can dynamically search, discover, and specify another entity to communicate with, or influence its own behavior, and interact with the specified entity.

This community can specifically deal with entities that have the following characteristics.

(1) An enormous number of very small sized entities exists in the community (an unspecified number of entities).

(2) Attributes of entities change in real time. Typical characteristics of entities are location information, time and the like.

(3) There is no rule for behavior of entities in the community, so it is difficult to foresee their movement.

(4) Participating in the community, leaving, disappearing from the community, reproducing, and the like, occur frequently and irregularly.

(5) It is necessary for entities in the community to meet each other in real time based on attributes, scenarios, and the like.

From the point of performance, it is not easy to manage entities having such characteristics using a mediator (broker), and to search for and discover each other in real time. An EP in SION 1 is ranked as an execution environment of a community having such characteristics. That is, a community is a meta execution environment, and provides a place of communication with a high degree of abstraction compared with the direct use of EPs. By using EPs as the execution environment of a community, every entity in the community can discover another entity to communicate with directly without using a broker. This is because communication among entities in the community is achieved as send and receive events in EPs.

Figure 15:
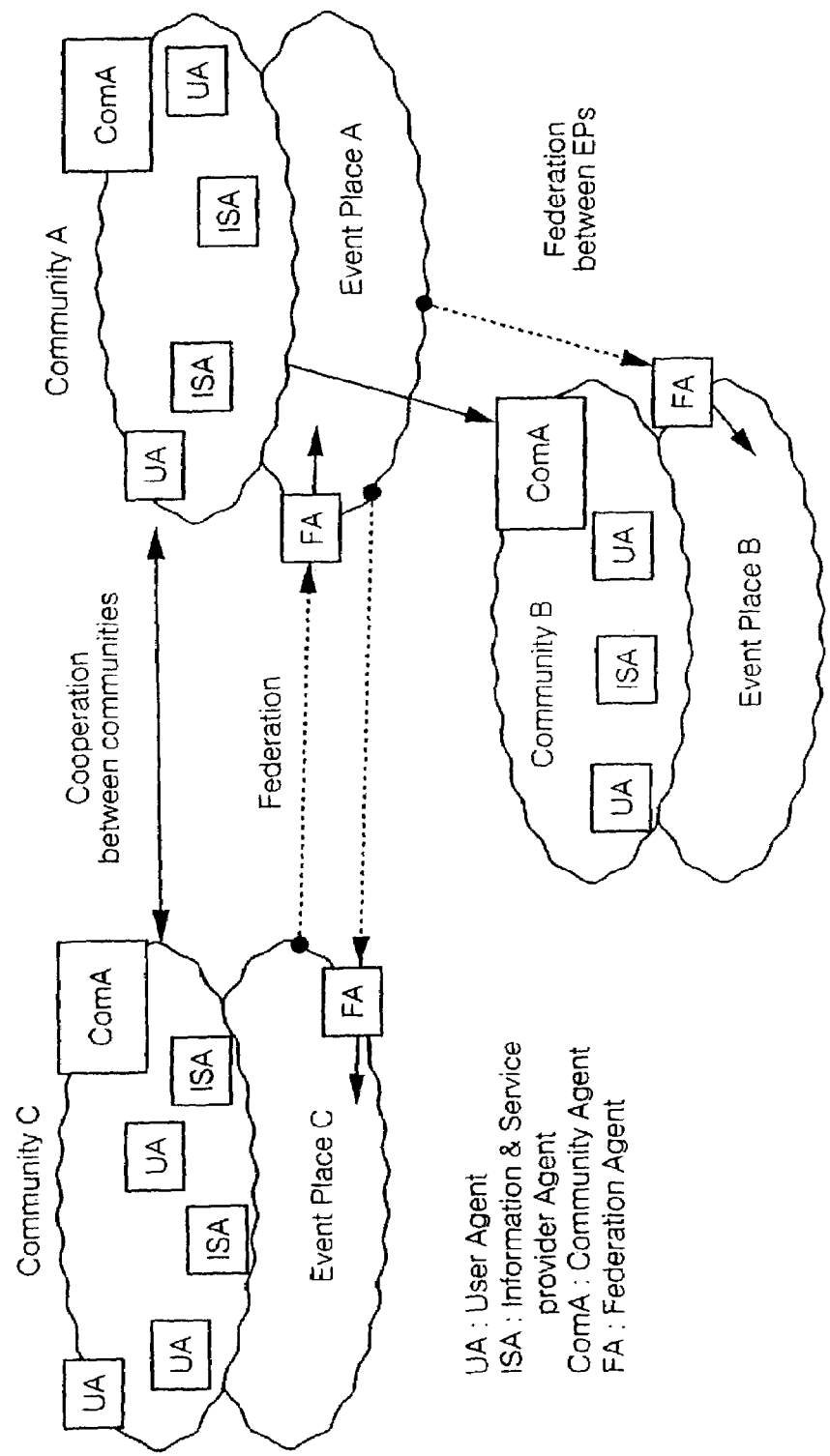
FIG. 15 is an explanatory diagram showing a community model.
Figure 16:
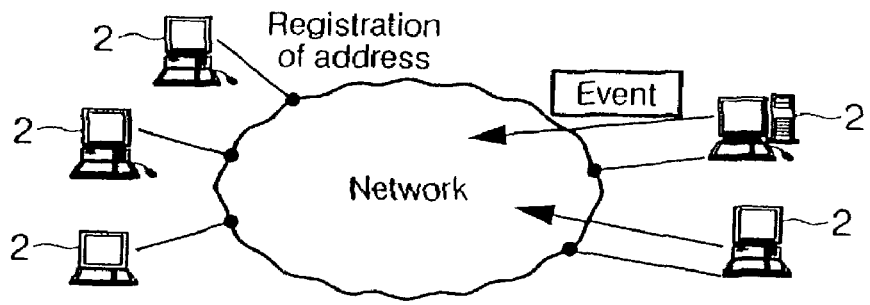
FIG. 16 is an explanatory diagram showing a prior art.
Figure 17:
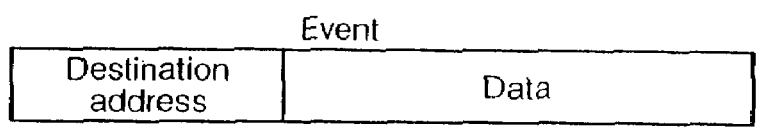
FIG. 17 is an explanatory diagram showing a prior art.
Figure 18:
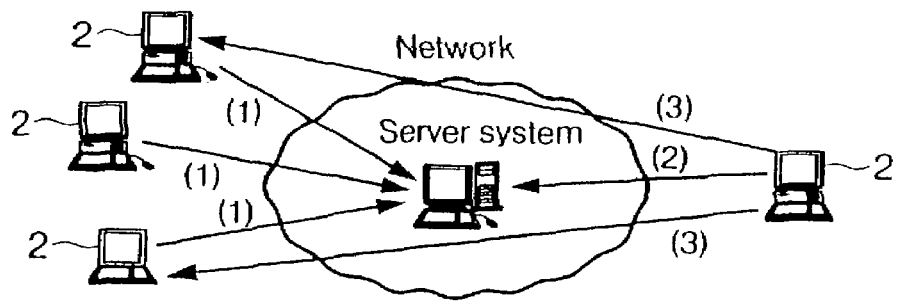
FIG. 18 is an explanatory diagram showing a prior art.
Figure 19:
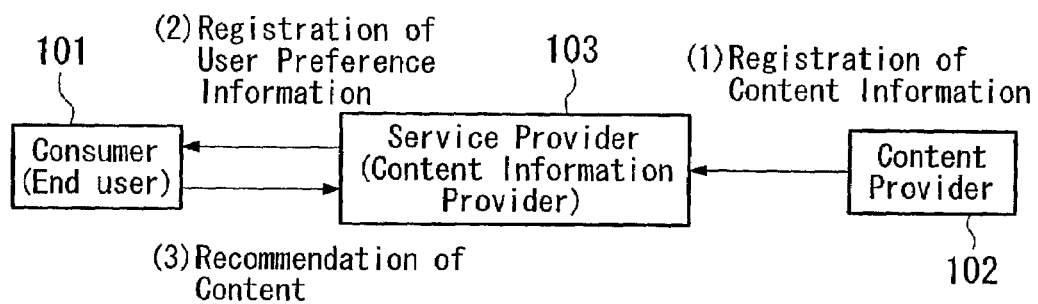
FIG. 19 is a diagram showing a broker type business model.
Figure 20:
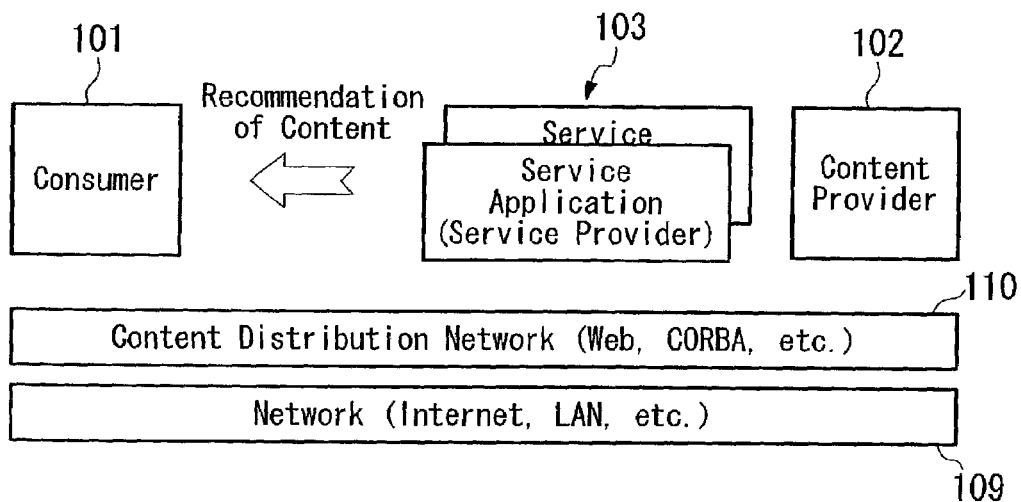
FIG. 20 is a diagram showing a broker type system structure.

FIG. 15 shows a conceptual model of a community. UAs and information and service provider agents (ISA) correspond to entities in the community. A UA is an agent that behaves autonomously as a user's agent, which decides its own behavior dynamically according to the user's preference, execution environment, location information, situation, trend and the like, searches for an ISA or another UA to interact with, and interacts with it. An ISA is an agent that behaves autonomously as an agent of an information provider or a service provider, which searches for a UA or another ISA to interact with. That is, it searches for and specifies an appropriate partner to which to provide its own information.

Furthermore, a community agent (ComA) is an agent that is in charge of administrating the community. An EP administrator performs control and administration of SION, with using SION-MT, based on an administration policy. Accordingly, the ComA can be regarded as an EP administrator serving as an agent. Basically, the administration policy of the community is defined by the ComA. It takes charge of, for example, the permission of UAs, ISAs and the like to participate in the community, leave, disappear, reproduce and the like; understanding and controlling information delivered through the community (removal of inappropriate events, etc.); management of statistical information (trend information, popular information, etc.) in the community; and the like based on its own administration policy.

Furthermore, in order to guarantee high scalability and reliability of a community, it performs SION control such as increasing, decreasing and removing EPs and EPOs, migration, and the like, according to load status and obstruction status. That is, by combining SION 1 and ComA, the SION 1 develops from an autonomous decentralized network to an evolutionary type network that can learn, grow and evolve. In this manner, a ComA controls the behavior of entities in the community, and also takes a role of self-organizing the SION 1. Moreover, by collaboration between communities, it is possible to share information among communities. It is possible, for example, to distribute only the top ten most popular pieces of information distributed in a community A to a community B. The Flow of Processing is Shown as Follows.

Firstly, the ComB in the community B instructs the FA in an event place B "to distribute only the top ten most popular pieces of information distributed in the community A".

Next, the FA requests the top ten most popular event types from an event place A. Receiving this, the event place A requests a statistical information collection object (SO) in it, and returns the result to the FA.

Next, the FA creates an ontology conversion table based on the obtained event type, and also establishes a filter for the event place A. Afterwards, the FA becomes capable of receiving the event concerned from the event place A.

Next, the FA converts the event obtained from the event place A based on the ontology conversion table, and sends it to the event place B.

As described above, according to this embodiment, the following effects can be obtained.

Firstly, it is possible to build a SION network environment in a distributed object environment.

Secondly, it is possible to send an event easily, and pick up a required event by participating as an entity in a service application in a community, thus enabling interactive communication to be achieved.

In the present embodiment, by using event places provided by SION, it is possible to build a global content information network easily. Furthermore, it is similarly applicable for exchanging other information such as service information, communication information, and the like.

Here, in the present invention, the addition, discard, or change of an entity does not influence other entities. That is, even if a new service is added, it does not influence existing services. Furthermore, even if a new function is added, it does not influence other functions. For example, even if a fault-tolerant function is added, it does not influence existing system elements. Accordingly, in the present invention, plug-in and plug-out of services/functions can be performed easily.

Moreover, in the present invention, the construction may be such that a software program to achieve the functions (event places, semantic information switches, semantic information routers, semantic information gateways and/or additional functions) of the above-described embodiment is recorded on a computer-readable recording medium, and the program recorded on this recording medium is read and executed by one or a plurality of computer systems. Here, "computer system" includes an OS and hardware such as peripheral equipment and the like.

Furthermore, "computer system" may be any device equipped with a central processing unit (CPU) and memory connected controllably by this CPU, and may be an information terminal such as a personal computer, a PDA, a mobile phone, a workstation, a mainframe, or the like.

Moreover, "computer-readable recording medium" is a portable medium such as a floppy disk, an optical disk, a ROM, a CD-ROM, a CD-R and the like, or a storage device such as a hard disk equipped in a computer system. Furthermore, "computer-readable recording medium" also includes anything holding a program for a certain time such as volatile memory (RAM) inside a computer system, which becomes a server or a client when the program is sent via a network such as the Internet, etc. and a communication line such as a telephone line, etc.

Moreover, the above-mentioned program may be transmitted from a computer system wherein this program is stored in a storage device to another computer system via a transmission medium or transmitted waves in a transmission medium. Here, "transmission medium" is a medium having a function of transmitting information like a network (communication network) such as the Internet and the like, or a communication circuit (communication line) such as a telephone line and the like.

Furthermore, the above-mentioned program may be an entity for achieving a part of the aforementioned function. Moreover, it may be an entity that can achieve the function by combination with a program already stored in the computer system, a so-called difference file (difference program).

In the above, the embodiment of this invention has been precisely described with reference to the figures. However, the specific configuration is not limited to this embodiment, and any design and the like which does not depart from the gist of this invention is also included.

INDUSTRIAL APPLICABILITY

As described above, according to the present invention, it is possible for an event place to fetch an event delivered only in another event place by a federation system between event places using an FA. That is, it is possible to use an information provider belonging to another event place.

Conversely, it is possible to advertise an event delivered in an event place by sending the event to other event places. That is, it is also possible to obtain an end user belonging to another event place. In this manner, it is possible to share events among different event places, and it is also possible to build a global, autonomous decentralized comparison network using a bottom up approach by interaction between event places, wherein ontology is considered.

It is possible to distribute the load of filter processing to a plurality of EPOs by a multiple EPO system, and it is also possible to minimize network traffic by an event routing system that operates autonomously among the EPOs. As a result, it is possible to improve the total throughput of an EP scalably.

It is possible to search for and discover another, appropriate entity directly without using a broker.

For example, an information provider can specify an appropriate end user for information that it provides without being aware of the end user. A case of a content provider that wants to provide certain content is considered. That is, this content provider is an information provider as mentioned previously. It is possible to realize an order taking society easily wherein a content provider itself provides content to an end user appropriate to the content. Heretofore, a method wherein an end user specifies content appropriate to itself, by an end user initiative service provider inquiry type comparison, has been the norm. Furthermore, it is possible for a content provider to be a sender of content information without depending on a specific content information provider.

As a result, a content provider can send not only content but also content information according to its own policy.

Similarly, an end user can search for and discover an information provider (content provider in the case described above) appropriate to its own preference without being aware of the existence of the information provider (content provider).

That is to say with both behaviors, an end user and an information provider (content provider) are transparent to each other. As a result, it is possible to broadcast information in real time without depending on a specific broker based on its own policy.

Furthermore, in the case where the number of entities, being search targets, is enormous, or in the case where an entity moves into and out of a search object domain frequently, a search technique based on a brokerless model is especially effective.

In SION, the end point of semantic information is a network. In contrast, in a method where peer-to-peer connection is performed between terminals, the end point of semantic information is a terminal, and the content of the terminal is disclosed outside. Therefore SION can realize higher security and privacy protection than the latter method.

Whether federation of an event place is permitted or not is a matter for administration, which is basically charged to administrators. Technically, it is possible to build a global network using a federation system. This closely resembles the situation wherein the Internet is formed by the interconnection of LANs (If specific LAN connections had been refused, the Internet of today would not have existed. Similarly, permitting the interconnection of event places via federation agent methods (FAs), should basically be a matter for administration). Here, it is considered that an arrangement to guarantee the right of content providers and event place administrators is necessary. However, it is considered that this can be achieved by setting the content of filters and by jointly using click guarantee techniques and the like. On the other hand, protection of end users' privacy is also an important issue. In the case of an order taker comparison, content information is delivered as an event between event places, and user preference information is hided in event places, so that it is possible to protect end users' privacy comparatively easily.

Moreover, the sending of events, reception of events, and the registration of event types are performed through sessions, being connections between terminals of event receivers, event senders or event type registers and semantic information switches. It is possible to locate semantic information switches on any host (terminal) by these sessions.

The invention claimed is:

1. An event delivery apparatus for delivering, on network, an event comprising data and semantic information, being metadata of the data, based on the semantic information, said event delivery apparatus comprising:

an event place that is a place for comparing an event sent from an event sender with a filter in which semantic information of an event that one or more of a plurality of event receivers with to receive is registered as an event acquisition condition, said plurality of said event receivers being different from said event sender, said event place being the smallest unit in which semantic information is described based on a common ontology system, to limit an event delivery range, said event place including, distinct from said event sender:

a plurality of semantic information switches each of which compares semantic information assigned to said event sent from said event sender with semantic information registered in said filter and delivers said event sent from said event sender to said one or more of said event receivers registered in said filter among said plurality of said event receivers when said semantic information of said event sent from said event sender is coincident with said semantic information of said event registered in said filter; and a semantic information router connected to said semantic information switches to route said event between said semantic information switches based on said semantic information, and forwards said event between said semantic information switches; wherein said event place is provided with:

a central processing unit; and memory connected controllably by said central processing unit, and said memory stores software that can be executed in said central processing unit, which creates a shared link for forwarding an event based on physical link information of an event place object that achieves said semantic information switch, and which, based on a shared link established by a shared link object, routes an event between said semantic information switches, and forwards an event between said semantic information switches, and said event place achieves said semantic information router by executing said software;

said central processing unit executes said program, which when forwarding an event between said semantic information switches, establishes an event path for each event type by registering a filter for delivering said event to a series of event place objects, and in which two latest identifiers of event place objects that it has passed through are held as control information for an event to be forwarded, so that infinite event forwarding is prevented by reference to said control information; and when delivering an event, said semantic information router is provided with:

an event identifier assignment function for assigning each event an identifier that can identify it uniquely;

and a detection function for detecting whether a duplicate event was delivered from a different path by comparison with event identifiers that were delivered and stored in the past.

2. An event delivery apparatus according to claim 1, wherein there is further provided a semantic information gateway for forwarding events between said event place.

3. An event delivery apparatus according to claim 2, wherein said semantic information gateway is provided with:

a filtering function that when forwarding an event between said event places, an event from an event place, being a sender, forwards only said event, which matches the condition of an event required by an event place, being a receiver.

4. An event delivery apparatus according to claim 2, wherein, when forwarding an event between said event places, in the case where said event places have different ontology systems, said semantic information gateway forwards said event after performing ontology conversion on the forwarding event using ontology conversion information in which the correspondence between the ontology systems is described.

5. An event delivery apparatus according to claim 4, wherein said semantic information gateway contains the difference in ontology information between adjacent event places as ontology conversion information, and performs ontology conversion of a forwarded event using said ontology conversion information.

6. An event delivery apparatus according to claim 4, wherein said semantic information gateway acquires a collection of event types registered in said event places from both event places, being objects of conversion, as said ontology information, obtains the correspondence between the two event types, and the correspondence between slots, being items in the event types, calculating said correspondences as ontology conversion information, and performs ontology conversion of the forwarded event using said ontology conversion information.

7. An event delivery apparatus according to claim 2, wherein said semantic information gateway is provided with:

a central processing unit; and memory connected controllably by said central processing unit, and said memory stores software that can be executed in said central processing unit, which registers a filter for an event place, being an event forwarding destination, in an event place, being an event forwarding source, among event places, and in which only events that pass through said registered filter are forwarded to an event place, being an event forwarding destination.

8. An event delivery apparatus according to claim 1, wherein said event place receives the request of the registration of an event type, being a template of semantic information, and registers said event type in said event place in the case where said received event type is not duplicated.

9. An event delivery apparatus according to claim 1, wherein said semantic information switch categorizes said filter for each event type, being a template of semantic information, further sub-categorizes said filter for each session for management, and in the case where a plurality of filters is registered in the same session, manages the relationships between the filters as a logical OR operation.

10. An event delivery apparatus according to claim 1, wherein said event place is provided with:

a central processing unit; and memory connected controllably by said central processing unit, and said memory stores a program that can be executed by said central processing unit, which creates an event place object for achieving said semantic information switch, and creates a shared link object that achieves said semantic information router based on topology information of said event place object, and which associates said event place object and said shared link object based on said topology information.

11. An event delivery apparatus according to claim 10 wherein said central processing unit executes said program, in which a host that creates said event place object is dynamically determined from among the hosts capable of creating an event place object in order to distribute the load of event comparison processing in said event place, and an event place object is created in said determined host.

12. An event delivery apparatus according to claim 10, wherein said central processing unit executes said program, which when creating said shared link, creates a ring shaped, unidirectional shared link object among said event place objects, and when forwarding an event between said semantic information switches, establishes an event path for each event type by registering a filter for delivering said event to a series of event place objects, refers the identifier of an event place object, being the source of an event occurrence, which a forwarded event holds, and discards said event when said event is delivered to the source of an event occurrence.

13. An event delivery apparatus according to claim 12, wherein said central processing unit executes said program which, when forwarding an event between said semantic information switches, when registering a filter for delivering said event, instead of establishing an event path, registers a filter in which a wildcard is assigned as an event type in order to deliver said event to all event place objects in an event place.

14. An event delivery apparatus according to claim 10, wherein said central processing unit also executes said software that creates an information collection object for collecting statistical information regarding events delivered in said event place.

15. An event delivery apparatus according to claim 1, wherein said event place is further provided with a function for collecting statistical information regarding events delivered in said event place.

16. An event delivery apparatus according to claim 1, wherein said event place guarantees a common ontology system by managing ontology systems in event places, comprising event types, being templates of semantic information, inheritance relationships between event types, said metadata, being instances of event types.

17. A community providing apparatus achieved in an event delivery apparatus according to claim 1, which is provided with:

a permission function for granting approval or denial of the like of participation in said community;

a management function for understanding and controlling information delivered in said community; and a statistical processing function for performing statistical management of information delivered in said community.

18. A community providing apparatus according to claim 17, wherein said community is implemented using event places provided by said event delivery apparatus, and said management functions set information that can be delivered from adjacent communities on the semantic information gateway provided by said event delivery apparatus.

19. A semantic information gateway for delivering events comprising data and semantic information, being metadata of the data, between a plurality of event place which are the smallest units in which said semantic information is described based on a common ontology system, to limit a delivery range of events on a network, each of said event places including:

a semantic information switch which compares an event sent from an event sender with a filter in which semantic information of an event that one or more of a plurality of event receivers wish to receive is registered as an acquisition condition of the event, and delivers said event sent from said event sender to said one or more of said event receivers registered in said filter among said plurality of said event receivers when said semantic information of said event sent from said event sender is coincident with said semantic information of said event registered in said filter, said plurality of said event receivers and said semantic information switch being different from said event sender, said semantic information gateway comprising:

a forwarding section which receives said event from said semantic information switch belonging to the event place of said event sender and sends said event to said semantic information switch belonging to the event place of said one or more of said event receivers set in said filter, said forwarding section being provided with:

a function for forwarding said event between said event places based on semantic information; and a function for performing ontology conversion on the forwarded event using ontology conversion information in which the correspondence between the ontology systems is described, in the case where said event places have different ontology systems; wherein
said event place is provided with:
a central processing unit; and
memory connected controllably by said central processing unit, and
said memory stores software that can be executed in said central processing unit, which creates a shared link for forwarding an event based on physical link information of an event place object that achieves said semantic information switch, and which, based on a shared link established by a shared link object, routes an event between said semantic information switches, and forwards an event between said semantic information switches, and said event place achieves said semantic information router by executing said software;
said central processing unit executes said program, which when forwarding an event between said semantic information switches, establishes an event path for each event type by registering a filter for delivering said event to a series of event place objects, and in which
two latest identifiers of event place objects that it has passed through are held as control information for an event to be forwarded,
so that infinite event forwarding is prevented by reference to said control information; and when delivering an event, said semantic information router is provided with:
an event identifier assignment function for assigning each event an identifier that can identify it uniquely;
and a detection function for detecting whether a duplicate event was delivered from a different path by comparison with event identifiers that were delivered and stored in the past.

20. A semantic information gateway according to claim 19, wherein said forwarding section is further provided with a function for registering a filter in an event place, being an event forwarding source, by an event place, being an event forwarding destination, among event places, and
said event forwarding function forwards only events that pass through the registered filter to an event place, being an event forwarding destination.

21. A semantic information switch for notifying an event receiver, being the destination of an event delivered on a network, of an event comprising data and semantic information, being metadata of said data, based on semantic information, which is provided with:
a function for registering a filter in which the semantic information of an event that one or more of a plurality of event receivers wish to receive is registered as an acquisition condition of the event;
a function for categorizing the filter for each event type, being templates of semantic information, and further subcategorizing said filters in each session for management, and in the case where a plurality of filters is registered in the same session, for managing the relationships between said filters as a logical OR operation;
a function for comparing the semantic information registered as said filter and semantic information assigned to an event sent from an event sender; and
a function for delivering said event sent from said event sender to said one or more of said event receivers registered in said filter among said plurality of event receivers when said semantic information of said event sent from said event sender is coincident with said semantic information of said event registered in said filter, said plurality of said event receivers and said semantic information switch being different from said event sender; wherein
said event place is provided with:
a central processing unit; and
memory connected controllably by said central processing unit, and
said memory stores software that can be executed in said central processing unit, which creates a shared link for forwarding an event based on physical link information of an event place object that achieves said semantic information switch, and which, based on a shared link established by a shared link object, routes an event between said semantic information switches, and forwards an event between said semantic information switches, and said event place achieves said semantic information router by executing said software;
said central processing unit executes said program, which when forwarding an event between said semantic information switches, establishes an event path for each event type by registering a filter for delivering said event to a series of event place objects, and in which
two latest identifiers of event place objects that it has passed through are held as control information for an event to be forwarded,
so that infinite event forwarding is prevented by reference to said control information; and when delivering an event, said semantic information router is provided with:
an event identifier assignment function for assigning each event an identifier that can identify it uniquely;
and a detection function for detecting whether a duplicate event was delivered from a different path by comparison with event identifiers that were delivered and stored in the past.

22. An event delivery method for delivering, on a network, an event comprising data and semantic information, being metadata of the data, based on the semantic information, comprising the steps of:
providing an event place that is a place for comparing an event from an event sender with a filter in which semantic information of an event that one or more of a plurality of event receivers wish to receive is registered as an event acquisition condition, said plurality of said event receivers being different from said event sender, said event place being the smallest unit in which semantic information is described based on a common ontology system, to limit an event delivery range;
providing a plurality of semantic information switches distinct from said event sender in said event place;
comparing semantic information assigned to said event sent from said event sender with semantic information registered in said filter in said semantic information switch;
delivering said event sent from said event sender to said one or more of said event receivers among said plurality of said event receivers when said semantic information of said event sent from said event sender is determined to be coincident with said semantic information of said event registered in said filter in said comparing step;
providing semantic information router connected to said semantic information switches in said event place; and
routing said event between said semantic information switches based on said semantic information using said semantic information router; and
forwarding said event between said semantic information switches; wherein
said event place is provided with:
a central processing unit; and
memory connected controllably by said central processing unit, and said memory stores software that can be executed in said central processing unit, which creates a shared link for forwarding an event based on physical link information of an event place object that achieves said semantic information switch, and which, based on a shared link established by a shared link object, routes an event between said semantic information switches, and forwards an event between said semantic information switches, and said event place achieves said semantic information router by executing said software;

said central processing unit executes said program, which when forwarding an event between said semantic information switches, establishes an event path for each event type by registering a filter for delivering said event to a series of event place objects, and in which two latest identifiers of event place objects that it has passed through are held as control information for an event to be forwarded, so that infinite event forwarding is prevented by reference to said control information; and when delivering an event, said semantic information router is provided with:

an event identifier assignment function for assigning each event an identifier that can identify it uniquely;

and a detection function for detecting whether a duplicate event was delivered from a different path by comparison with event identifiers that were delivered and stored in the past.

23. An event delivery method according to claim 22, comprising the steps of:
further establishing a semantic information gateway for forwarding events between said event places; and
forwarding events between said event places using said semantic information gateway.

24. An event delivery method according to claim 23, comprising a step of performing filtering in said semantic information gateway that, when forwarding an event between said event places, an event from an event place, being a sender forwards only said event, which matches the condition of an event required by an event place, being a receiver.

25. An event delivery method according to claim 23, comprising a step of, in said semantic information gateway, when forwarding an event between said event places, in the case where said event places have different ontology systems, forwarding said event after performing ontology conversion on the forwarding event using ontology conversion information in which the correspondence between the ontology systems is described.

26. An event delivery method according to claim 25, comprising the step of performing, in said semantic information gateway which contains the difference in ontology information between adjacent event places as ontology conversion information, ontology conversion of a forwarded event using said ontology conversion information.

27. An event delivery method according to claim 25, comprising the steps of acquiring, in said semantic information gateway, a collection of even types registered, as said ontology information, in said event places from both event places, being objects of conversion, obtaining the correspondence between the two event types, and the correspondence between slots, being items in the event types, calculating said correspondences as ontology conversion information, and performing ontology conversion of the forwarded event using said ontology conversion information.

28. An event delivery method according to claim 23, wherein said semantic information gateway is realized by the steps of:
registering a filter for an event place, being an event forwarding destination, in an event place, being an event forwarding source, among event places, and
forwarding only events that pass through said registered filter, to an event place, being an event forwarding destination.

29. An event delivery method according to claim 22, comprising the steps of:
receiving, in said event place, the request of the registration of an event type, being a template of semantic information, and
registering said event type in said event place in the case where said received event type is not duplicated.

30. An event delivery method according to claim 22, comprising the steps of:
categorizing in said semantic information switch, said filter for each event type, being a template of semantic information, and further sub-categorizing said filter for each session for management; and
in the case where a plurality of filters is registered in the same session, managing the relationships between the filters as a logical OR operation.

31. An event delivery method according to claim 22, wherein said event place is provided by the steps of:
creating an event place object for achieving said semantic information switch;
creating a shared link object that achieves said semantic information router based on topology information of said event place object; and
associating said event place object and said shared link object based on said topology information.

32. An event delivery method according to claim 31, comprising, in the creation of said event place object, the steps of:
dynamically determining a host from among the hosts capable of creating an event place object in order to distribute the load of event comparison processing in said event place; and
creating an event place object in said determined host.

33. An event delivery method according to claim 31, further comprising in realizing said event place, the step of creating an information collection object for collecting statistical information regarding events delivered in said event place.

34. An event delivery method according to claim 22, comprising, when creating said shared link,
the step of creating a ring shaped, unidirectional shared link object among said event place objects;
and when forwarding an event between said semantic information switches, the steps of:
establishing an event path for each event type by registering a filter for delivering said event to a series of event place objects;
referring the identifier of an event place object, being the source of an event occurrence, which forwarded event holds, and discarding said event when said event is delivered to the source of an event occurrence.

35. An event delivery method according to claim 34, comprising, when forwarding an event between said semantic information switches, the step of, when registering a filter for delivering said event, instead of establishing an event path, registering a filter in which a wildcard is assigned as an event type in order to deliver said event to all event place objects in an event place.

36. An event delivery method according to claim 22, further comprising in said event place, the step of collecting statistical information regarding events delivered in said event place.

37. An event delivery method according to claim 22, wherein said event place guarantees a common ontology system by managing ontology systems in event places, comprising event types, being templates of semantic information, inheritance relationships between event types and metadata, being instances of event types.

38. A community providing method implemented in an event delivery apparatus according to claim 22, comprising:
a step of granting approval or denial or the like of participation in said community;
a management step for understanding and controlling information delivered in said community; and
a statistical processing step for performing statistical management of information delivered in said community.

39. A community providing method according to claim 38, comprising the steps of:
creating said community using event places provided by said event delivery apparatus; and
setting, in said management step, information that can be delivered from adjacent communities on the semantic information gateway provided by said event delivery method.

40. A computer program which can be executed on a computer, for executing a method according to claim 22 by a system comprising said computer program and a computer.

41. A method of forwarding events between event places comprising the steps of:
defining an event comprising data and semantic information, being metadata of data;
providing a semantic information switch:
comparing, in said semantic information switch, an event sent from an event sender with a filter in which semantic information of an event that one or more of a plurality of event receivers wish to receive is registered as an event acquisition condition;
delivering said event sent from said event sender to one or more of said event receivers set in said filter among the plurality of said event receivers when said semantic information of said event sent from said event sender is determined to be coincident with said semantic information of said event registered in said filter in said comparing step using said semantic information switch, said plurality of said event receivers and said semantic information switch being different from said event sender;
providing event places which are the smallest unit in which said semantic information is described based on a common ontology system, to limit an event delivery range; and
forwarding said events between said event places by receiving said event from said semantic information switch belonging to the event place of said event sender and by sending said event to said semantic information switch belonging to the event place of said one or more of said event receivers set in said filter; and
performing ontology conversion on a forwarded event using ontology conversion information in which correspondence between ontology systems is described in the case where said event places have different ontology systems; wherein
said event place is provided with:
a central processing unit; and
memory connected controllably by said central processing unit, and
said memory stores software that can be executed in said central processing unit, which creates a shared link for forwarding an event based on physical link information of an event place object that achieves said semantic information switch, and which, based on a shared link established by a shared link object, routes an event between said semantic information switches, and forwards an event between said semantic information switches, and said event place achieves said semantic information router by executing said software;
said central processing unit executes said program, which when forwarding an event between said semantic information switches, establishes an event path for each event type by registering a filter for delivering said event to a series of event place objects, and in which
two latest identifiers of event place objects that it has passed through are held as control information for an event to be forwarded,
so that infinite event forwarding is prevented by reference to said control information; and when delivering an event, said semantic information router is provided with:
an event identifier assignment function for assigning each event an identifier that can identify it uniquely;
and a detection function for detecting whether a duplicate event was delivered from a different path by comparison with event identifiers that were delivered and stored in the past.

42. A method of forwarding events between event places according to claim 41, comprising the steps of, in said event forwarding, registering a filter for an event place, being an event forwarding destination, in an event place, being an event forwarding source, among event places; and
forwarding only events that pass through said registered filter to an event place, being an event forwarding destination.

43. An event delivery method for notifying an event receiver, being the destination of an event delivered on a network, of an event comprising data and semantic information, being metadata of the data, based on semantic information, comprising the steps of:
registering a filter in which the semantic information of an event that one or more of a plurality of event receivers wish to receive is registered as an acquisition condition of the event,
categorizing the filters for each event type, being templates of semantic information, and further subcategorizing said filters in each session for management, managing as a logical OR operation relationships between the filters, in the case where a plurality of filters is registered in the same session;
comparing, in a semantic information switch the semantic information registered as said filter and semantic information assigned to an event sent from an event sender, said event sender being different from said plurality of said event receivers and said semantic information switch, and
delivering said event sent from said event sender to said one or more of said event receivers among said plurality of said event receivers when said semantic information of said event sent from event sender is determined to be coincident with said semantic information of said event registered in said filter in said comparing step; wherein
said event place is provided with:
a central processing unit; and
memory connected controllably by said central processing unit, and
said memory stores software that can be executed in said central processing unit, which creates a shared link for forwarding an event based on physical link information of an event place object that achieves said semantic information switch, and which, based on a shared link established by a shared link object, routes an event between said semantic information switches, and forwards an event between said semantic information switches, and said event place achieves said semantic information router by executing said software;

said central processing unit executes said program, which when forwarding an event between said semantic information switches, establishes an event path for each event type by registering a filter for delivering said event to a series of event place objects, and in which two latest identifiers of event place objects that it has passed through are held as control information for an event to be forwarded, so that infinite event forwarding is prevented by reference to said control information; and when delivering an event, said semantic information router is provided with:

an event identifier assignment function for assigning each event an identifier that can identify it uniquely;

and a detection function for detecting whether a duplicate event was delivered from a different path by comparison with event identifiers that were delivered and stored in the past.

* * * * *